(12) United States Patent
Yamada et al.

(10) Patent No.: US 12,607,869 B2
(45) Date of Patent: Apr. 21, 2026

(54) LASER INTERFEROMETER

(71) Applicant: SEIKO EPSON CORPORATION,
Tokyo (JP)

(72) Inventors: Kohei Yamada, Shiojiri (JP); **Takeshi
Shimizu,** Chino (JP)

(73) Assignee: SEIKO EPSON CORPORATION,
Tokyo (JP)

( * ) Notice: Subject to any disclaimer, the term of this
patent is extended or adjusted under 35
U.S.C. 154(b) by 214 days.

(21) Appl. No.: 17/804,091

(22) Filed: May 25, 2022

(65) Prior Publication Data

US 2022/0390755 A1 Dec. 8, 2022

(30) Foreign Application Priority Data

May 27, 2021 (JP) .................................. 2021-089492

(51) Int. Cl.
G01B 9/02 (2022.01)
G02B 5/18 (2006.01)
G02B 6/02 (2006.01)
G02B 27/28 (2006.01)

(52) U.S. Cl.
CPC ....... G02B 27/283 (2013.01); G01B 9/02045
(2013.01); G01B 9/02083 (2013.01); **G02B
5/1861 (2013.01); G02B 6/02076** (2013.01);
G01B 2290/70 (2013.01)

(58) Field of Classification Search
CPC .. G01B 2290/70; G01B 9/02; G01B 9/02045;
G01B 11/2441
See application file for complete search history.

(56) References Cited

U.S. PATENT DOCUMENTS

| | | | |
|---|---|---|---|
| 5,208,819 A | 5/1993 | Huber | |
| 5,305,084 A | 4/1994 | Doi et al. | |
| 5,493,438 A | 2/1996 | Gay et al. | |

(Continued)

FOREIGN PATENT DOCUMENTS

| | | |
|---|---|---|
| EP | 1043817 A2 | 10/2000 |
| JP | H0238889 A | 2/1990 |

(Continued)

OTHER PUBLICATIONS

Archive.org result for "q-tech.com/application-notes/" on Sep. 6,
2019, shows "QTAN 108 Crystal Current Measurement" available.*

(Continued)

*Primary Examiner* — Jennifer D. Carruth
(74) *Attorney, Agent, or Firm* — CHIP LAW GROUP

(57) ABSTRACT

A laser interferometer that includes a light source which
emits laser light, an optical divider that divides the laser light
into a first optical path and a second optical path, an optical
modulator being provided on the first optical path or the
second optical path, including an oscillator that oscillates
when a current is applied, and modulate the laser light by
using the oscillator, a photoreceptor that receives the laser
light and output a photoreception signal, the laser light being
reflected by an object to be measured that is provided on the
first optical path or the second optical path, and a demodu-
lation circuit that demodulates, from the photoreception
signal, a Doppler signal derived from the object to be
measured, based on a reference signal and a modulation
signal derived from the optical modulator.

11 Claims, 20 Drawing Sheets

(56) References Cited

U.S. PATENT DOCUMENTS

| | | | |
|---|---|---|---|
| 5,539,520 A | 7/1996 | Telle | |
| 8,792,105 B2 * | 7/2014 | Khalil | G01B 9/02091 |
| | | | 356/497 |
| 11,404,626 B2 | 8/2022 | Mizugaki | |
| 2002/0024331 A1 | 2/2002 | Lewis et al. | |
| 2014/0041456 A1 * | 2/2014 | Rembe | G01H 9/00 |
| | | | 73/655 |
| 2019/0312565 A1 * | 10/2019 | Kojo | H03H 9/0509 |
| 2020/0058843 A1 | 2/2020 | Mizugaki et al. | |
| 2020/0309953 A1 | 10/2020 | Yamada | |

FOREIGN PATENT DOCUMENTS

| | | | |
|---|---|---|---|
| JP | H02293605 A | | 12/1990 |
| JP | H05275786 A | | 10/1993 |
| JP | H06326418 A | | 11/1994 |
| JP | H0954293 A | | 2/1997 |
| JP | 2000294870 A | | 10/2000 |
| JP | 2004233226 A | | 8/2004 |
| JP | 2007285898 A | * | 11/2007 |
| JP | 2020028095 A | | 2/2020 |
| JP | 2020165700 A | | 10/2020 |

OTHER PUBLICATIONS

Qtech, Qtan108 Crystal Current Measurement, available on or before Sep. 6, 2019 as evidenced by archive.org (Year: 2019).*

Infineon, Crystal Oscillator Basics, 2012 (Year: 2012).*

Archive.org result for "q-tech.com/application-notes/" on Sep. 6, 2019, shows "QTAN 108 Crystal Current Measurement" available (Year : 2019).*

Koyama, An Experimental Study of Frequency Jumps During the Aging of Quartz Oscillators, IEEE 1996 (Year: 1996).*

Mouser, Internet archive from Jan. 11, 2015 of: https://www.mouser.com/applications/mems-oscillators/ (Year: 2015).*

European Search Report issued on Oct. 5, 2022, 2 pages of search report.

Office Action for JP Patent Application No. 2021089492, issued on May 7, 2025, 12 pages.

Office Action for JP Patent Application No. JP2021089492, issued on Feb. 4, 2025, 10 pages.

Sekiji Yamagata, Study on the Applications on the Light Modulation by the Dynamic Photo-Elastic Effect, Report No. 7 Aging Characteristics of the Light Modulation Quartz Crystal Oscillator, Nov. 7, 2012, pp. 13-24, Journal of Hokkaido University of Education (Section II A) vol. 34, No. 1.

* cited by examiner $$\psi_m = B \sin(\omega_m t)$$

PHASE $\psi_m$ OF
MODULATION
SIGNAL

TIME t

DEMODULATION RESULT WITH SN RATIO OF
80 dB (SIGNAL-TO-NOISE RATIO OF 0.01%)

DEMODULATION WITH SN RATIO OF
60 dB (SIGNAL-TO-NOISE RATIO OF 0.1%)

GRAPH OBTAINING BY OVERLAPPING OPTIMAL RANGE OF LOAD CAPACITANCE
$C_L$ WITH RELATIONSHIP BETWEEN LOAD CAPACITANCE $C_L$ AND B VALUE

RELATIONSHIP BETWEEN CAPACITANCE OF SECOND CAPACITOR
AND CUT-OFF FREQUENCY OF PRIMARY CR LOW PASS FILTER

LASER INTERFEROMETER

The present application is based on, and claims priority from JP Application Serial Number 2021-089492, filed May 27, 2021, the disclosure of which is hereby incorporated by reference herein in its entirety.

BACKGROUND

1. Technical Field

The present disclosure relates to a laser interferometer.

2. Related Art

JP-A-9-54293 discloses a laser Doppler velocimeter (laser interferometer) that measures a velocity of an object by irradiating, with a laser beam, the object that is oscillating and using a frequency of the laser beam changed due to the Doppler effect. The laser Doppler velocimeter requires a structure of modulating light emitted from a laser light source so as to detect directivity of an oscillation phenomenon of the object. Thus, JP-A-9-54293 discloses that an acousto-optical modulator or an electro-optical modulator is used.

Further, JP-A-2007-285898 discloses a laser oscillometer (laser interferometer) using an oscillator such as a piezoelectric element or a crystal oscillator in place of an expensive acousto-optical modulator (AOM). When such an oscillator is irradiated with laser light, a frequency of the laser light is shifted. In this manner, the laser light having a shifted frequency is used as reference light. With this, a Doppler signal is demodulated from scattered laser light subjected to Doppler shifting by the oscillating object. An oscillation velocity of the object can be measured from the Doppler signal. With the laser oscillometer of this type, an inexpensive oscillator can be used, and hence the laser oscillometer can be reduced in cost.

Meanwhile, JP-A-2-38889 discloses a laser Doppler velocimeter configured such that a sinusoidal wave is applied to an optical modulator, a light detection element receives a reference light beam acquired by subjecting a light beam from a laser light source to frequency shifting and a reflection light beam acquired by irradiating an object to be measured with the light beam, and a photoreception signal is subjected to predetermined arithmetic processing and then to FM demodulation processing. In the laser Doppler velocimeter of this type, the predetermined arithmetic processing is executed before the FM demodulation processing. With this, even when the frequency of the reference light beam is shifted to have a sinusoidal wave shape, a signal corresponding to a velocity of the object to be measured can be acquired from the photoreception signal.

In some cases, the laser interferometer using an oscillator cannot measured a velocity of the object to be measured in an accurate manner. Specifically, intensity of a modulation signal in the reference light is significantly small depending on an oscillation condition of the oscillator. In this case, a Doppler signal derived from the object to be measured cannot be demodulated in an accurate manner.

SUMMARY

A laser interferometer according to an application example of the present disclosure includes a light source configured to emit laser light, an optical divider configured to divide the laser light into a first optical path and a second optical path, the laser light being emitted from the light source, an optical modulator being provided on the first optical path or the second optical path, including an oscillator that oscillates when a current is applied, and being configured to modulate the laser light by using the oscillator, a photoreceptor configured to receive the laser light and output a photoreception signal, the laser light being reflected by an object to be measured that is provided on the first optical path or the second optical path, and a demodulation circuit configured to demodulate, from the photoreception signal, a Doppler signal derived from the object to be measured, based on a reference signal and a modulation signal derived from the optical modulator, wherein $Iq/f \leq 1 \times 10^{-7}$, wherein an amplitude value of the current applied to the oscillator that is oscillating is Iq [A] and an oscillation frequency of the oscillator is f [Hz].

DESCRIPTION OF EXEMPLARY EMBODIMENTS

Figure 1:
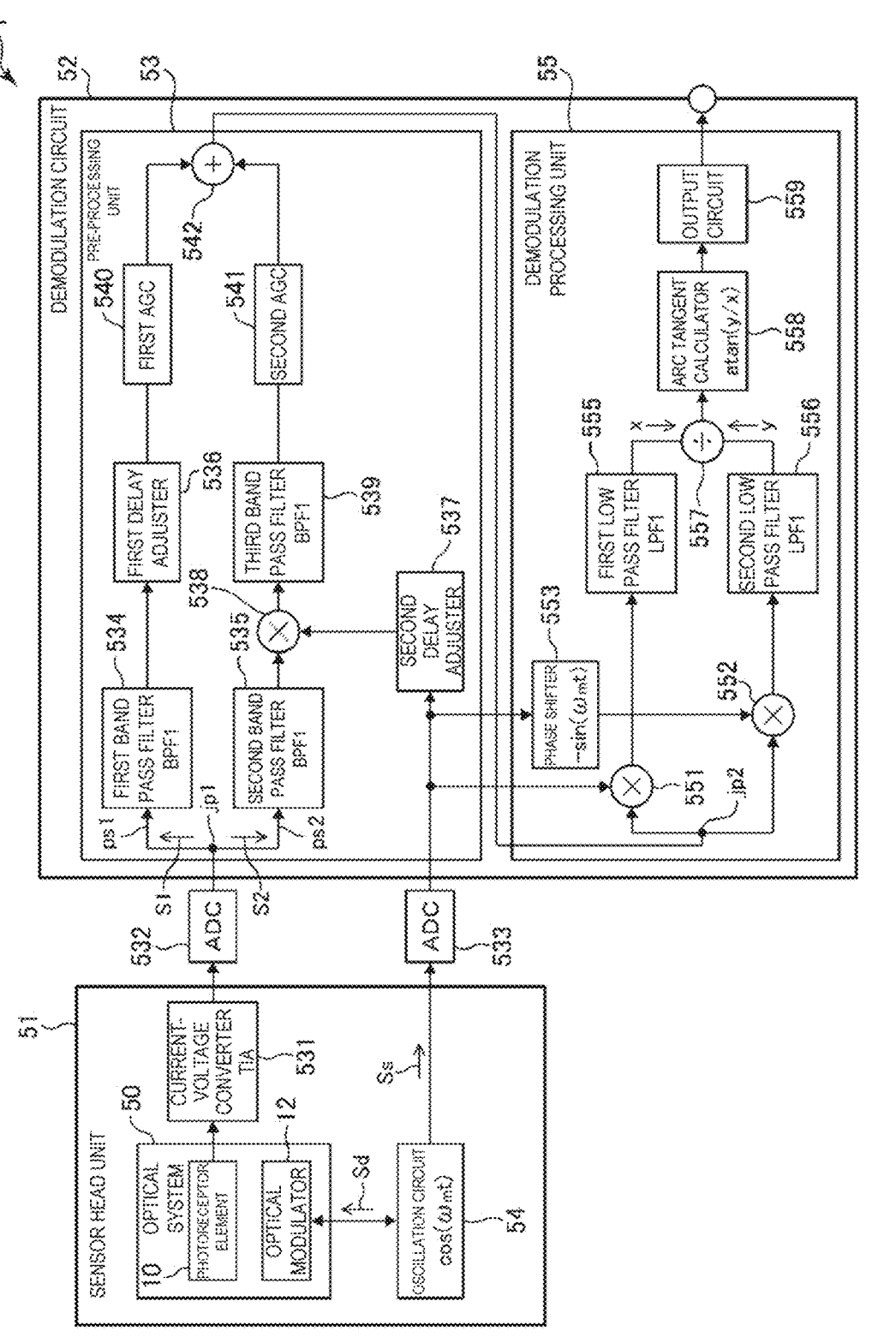
FIG. 1 is a functional block diagram illustrating a laser interferometer according to an exemplary embodiment.

A laser interferometer according to the present disclosure is described below in detail with reference to an exemplary embodiment illustrated in accompanying drawings. FIG. 1 is a functional block diagram illustrating a laser interferometer according to the exemplary embodiment.

The laser interferometer 1 illustrated in FIG. 1 includes a sensor head unit 51 including an optical system 50 and an oscillation circuit 54, and a demodulation circuit 52 to which a photoreception signal is input from the optical system 50.

1. Sensor Head Unit

Figure 2:
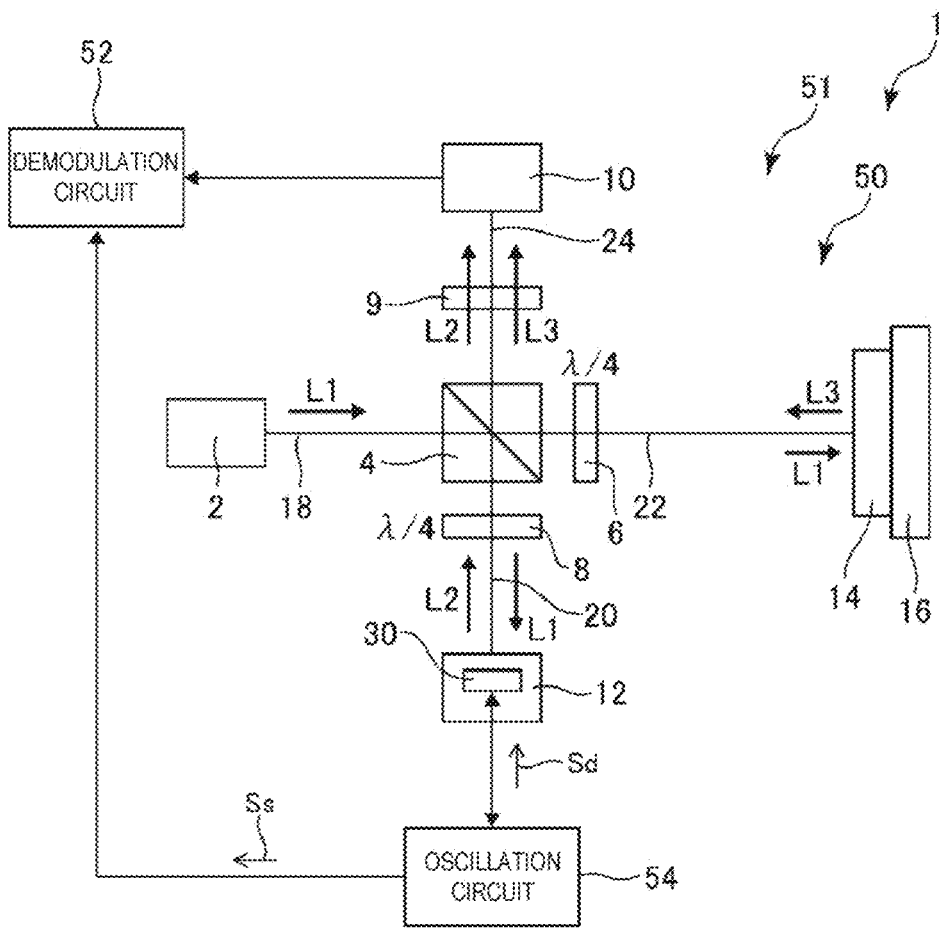
FIG. 2 is a schematic configuration view illustrating a sensor head unit illustrated in FIG. 1.

FIG. 2 is a schematic configuration view illustrating the sensor head unit 51 illustrated in FIG. 1.

1.1. Optical System

As described above, the sensor head unit 51 includes the optical system 50.

As illustrated in FIG. 2, the optical system 50 includes a light source 2, a polarized beam splitter 4 (optical divider), a ¼ wave plate 6, a ¼ wave plate 8, an optical analyzer 9, a photoreceptor 10, an optical modulator 12 of a frequency shifter type, and a set unit 16 in which an object 14 to be measured is arranged.

The light source 2 emits emitted light L1 (first laser light) having a predetermined wavelength. The photoreceptor 10 converts the received light into an electrical signal. The optical modulator 12 includes an oscillator 30, modulates the emitted light L1, and generates reference light L2 (second laser light) containing a modulation signal. The set unit 16 may be provided as required, and the object 14 to be measured can be arranged therein. The emitted light L1 entering the object 14 to be measured is reflected as an object light L3 (third laser light) containing a sample signal being a Doppler signal derived from the object 14 to be measured.

An optical path of the emitted light L1 emitted from the light source 2 is an optical path 18. When the polarized beam splitter 4 is reflected, the optical path 18 is joined to an optical path 20. In the optical path 20, the ¼ wave plate 8 and the optical modulator 12 are arranged in the stated order from the polarized beam splitter 4 side. Further, due to transmission through the polarized beam splitter 4, the optical path 18 is joined to an optical path 22. In the optical path 22, the ¼ wave plate 6 and the set unit 16 are arranged in the stated order from the polarized beam splitter 4 side.

Due to transmission through the polarized beam splitter 4, the optical path 20 is joined to an optical path 24. In the optical path 24, the optical analyzer 9 and the photoreceptor 10 are arranged in the stated order from the polarized beam splitter 4 side.

The emitted light L1 emitted from the light source 2 enters the optical modulator 12 via the optical path 18 and the optical path 20. Further, the emitted light L1 enters the object 14 to be measured, via the optical path 18 and the optical path 22. The reference light L2 generated by the optical modulator 12 enters the photoreceptor 10 via the optical path 20 and the optical path 24. The object light L3 generated through reflection by the object 14 to be measured enters the photoreceptor 10 via the optical path 22 and the optical path 24.

Each of the units of the optical system 50 is further described.

1.1.1. Light Source

The light source 2 is a laser light source that emits the emitted light L1 having a small beam width with coherence. When the beam width is expressed with a frequency difference, a laser light source having a beam width equal to or less than the MHz band is preferably used. Specifically, examples thereof include a gas laser such as a HeNe laser and a semiconductor laser element such as a Distributed Feedback-Laser Diode (DFB-LD), a Fiber Bragg Grating-Stabilized Laser Diode (FBG-LD), and a vertical cavity surface emitting laser (VCSEL).

Particularly, the light source 2 preferably includes a semiconductor laser element. With this, particularly, the light source 2 can be reduced in size. Thus, the laser interferometer 1 can be reduced in size. Particularly, in the laser interferometer 1, the sensor head unit 51 in which optical system 50 is accommodated can be reduced in size and weight. Thus, this is advantageous in improving operability of the laser interferometer 1.

1.1.2. Polarized Beam Splitter

The polarized beam splitter 4 is an optical element that divides incident light into transmitted light and reflected light. Further, the polarized beam splitter 4 has a function of transmitting P-polarized light and reflecting S-polarized light. In the following description, it is assumed that the emitted light L1 being leaner polarized light, for example, with a ratio of the P-polarized light and the S-polarized light of 50:50 enters the polarized beam splitter 4.

As described above, the polarized beam splitter 4 reflects the S-polarized light and transmits the P-polarized light of the emitted light L1.

The S-polarized light of the emitted light L1, which is reflected by the polarized beam splitter 4, is converted into circularly polarized light by the ¼ wave plate 8, and enters the optical modulator 12. First circularly polarized light of the emitted light L1, which enters the optical modulator 12, is subjected to frequency shifting at $f_m$ [Hz], and is reflected as the reference light L2. Therefore, the reference light L2 contains a modulation signal at a frequency of $f_m$ [Hz]. The reference light L2 is converted into the P-polarized light when passing through the ¼ wave plate 8 again. The P-polarized light of the reference light L2 passes through the polarized beam splitter 4 and the optical analyzer 9, and enters the photoreceptor 10.

The P-polarized light of the emitted light L1, which passes through the polarized beam splitter 4, is converted into circular polarized light by the ¼ wave plate 6, and enters the object 14 to be measured, which is in a moving state. Second circularly polarized light of the emitted light L1 entering the object 14 to be measured is subjected to Doppler shifting at $f_d$[Hz], and is reflected as the object light L3. Therefore, the object light L3 contains a sample signal at a frequency of $f_d$[Hz]. The object light L3 is converted into the S-polarized light when passing through the ¼ wave plate 6 again. The S-polarized light of the object light L3 is reflected by the polarized beam splitter 4, passes through the optical analyzer 9, and enters the photoreceptor 10.

As described above, the emitted light L1 has coherence. Thus, the reference light L2 and the object light L3 enters the photoreceptor 10 as interference light.

Note that, in place of the polarized beam splitter, a non-polarized beam splitter may be used. In this case, the ¼ wave plate 6 and the ¼ wave plate 8 are not required. Thus, the number of components can be reduced, and hence the laser interferometer 1 can be reduced in size. Further, an optical divided other than the polarized beam splitter 4 may be used.

1.1.3. Optical Analyzer

The S-polarized light and the P-polarized light that are orthogonal to each other are independent from each other. Thus, a beat due to interference does not appear simply by overlapping the light with each other. In view of this, a light wave obtained by overlapping the S-polarized light and the P-polarized light with each other is caused to pass through the optical analyzer 9 that is inclined at 45 degrees with respect to both the S-polarized light and the P-polarized light. When the optical analyzer 9 is used, light having a shared component is transmitted, and thus interference can be caused. As a result, the reference light L2 and the object light L3 interfere with each other at the optical analyzer 9, and interference light having a frequency of $|f_m-f_d|$ [Hz] is generated.

1.1.4. Photoreceptor

The reference light L2 and the object light L3 enter the photoreceptor 10 via the polarized beam splitter 4 and the optical analyzer 9. With this, the reference light L2 and the object light L3 perform optical heterodyne interference, and the interference light having a frequency of $|f_m-f_d|$ [Hz] enters the photoreceptor 10. A sample signal is demodulated from the interference light by a method described below. With this, movement of the object 14 to be measured, specifically, an oscillation velocity and displacement thereof can finally be obtained. Examples of the photoreceptor 10 include a photo diode.

1.1.5. Optical Modulator

Figure 3:
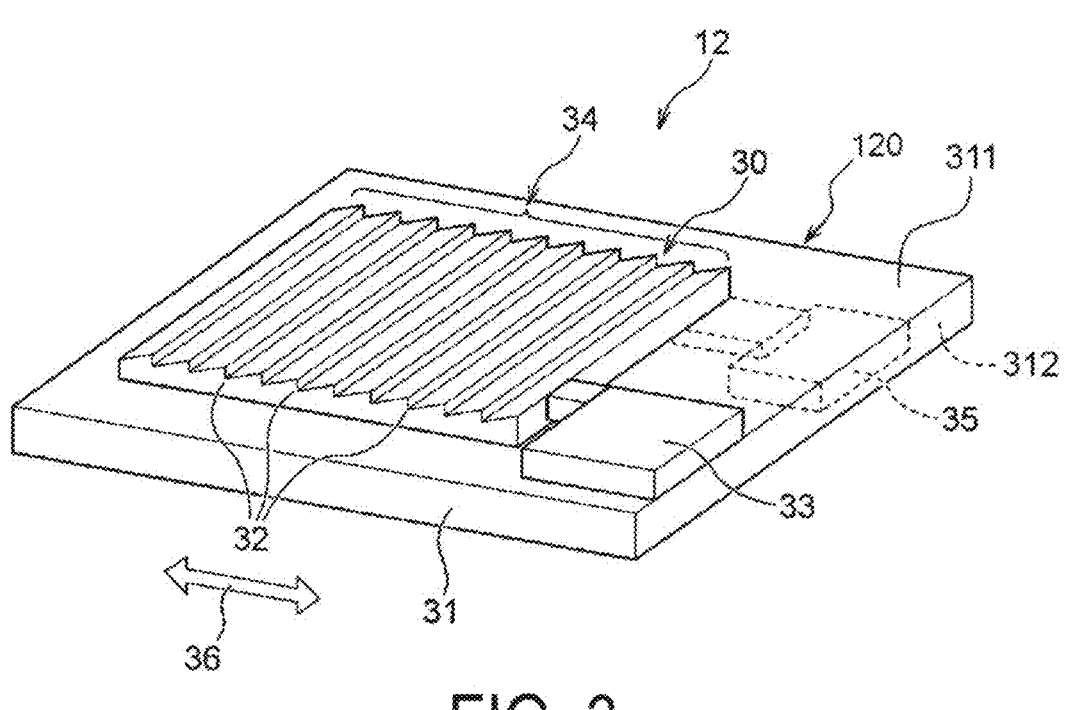
FIG. 3 is a perspective view illustrating a first configuration example of an optical modulator illustrated in FIG. 2.

FIG. 3 is a perspective view illustrating a first configuration example of the optical modulator 12 illustrated in FIG. 2.

1.1.5.1. Outline of First Configuration Example of Optical Modulator

The optical modulator 12 of a frequency shifter type includes an optical modulation oscillator 120. The optical modulation oscillator 120 illustrated in FIG. 3 includes the oscillator 30 that has a plate-like shape and a base board 31 that supports the oscillator 30.

The oscillator 30 is formed of a material that repeats an oscillation mode so that the oscillator 30 is distorted in a direction along with the surface when a potential is applied. In the present configuration example, the oscillator 30 is a crystal AT oscillator that performs thick slide oscillation along an oscillation direction 36 in a high frequency region in the MHz band. A diffraction grating 34 is formed on the surface of the oscillator 30. The diffraction grating 34 has a structure in which grooves 32 each having a component intersecting with the oscillation direction 36, in other words, a plurality of linear grooves 32 are periodically arrayed to extend in a direction intersecting with the oscillation direction 36.

The base board 31 has a front surface 311 and a back surface 312 that have a front-and-rear relationship therebetween. The oscillator 30 is arranged on the front surface 311. Further, a pad 33 that applies a potential to the oscillator 30 is provided to the front surface 311. Meanwhile, a pad 35 that applies a potential to the oscillator 30 is also provided to the back surface 312.

The base board 31 has such a size that a longitudinal side thereof is approximately from 0.5 mm to 10.0 mm, for example. Further, the base board 31 has a thickness of approximately from 0.10 mm to 2.0 mm, for example. As one example, the base board 31 has a square shape having a side of 1.6 mm and a thickness of 0.35 mm.

The oscillator 30 has such a size that a longitudinal side thereof is approximately from 0.2 mm to 3.0 mm, for example. Further, the oscillator 30 has a thickness of approximately from 0.003 mm to 0.5 mm, for example.

As one example, the oscillator 30 has a square shape having a side of 1.0 mm and a thickness of 0.07 mm. In this case, the oscillator 30 oscillates at a fundamental oscillation frequency of 24 MHz. Note that the oscillation frequency can be adjusted in the range from 1 MHz to 1 GHz by changing the thickness of the oscillator 30 or even considering overtone oscillation.

Note that, in FIG. 3, the diffraction grating 34 is formed on the entire surface of the oscillator 30, but may be formed only on a part of the surface.

A magnitude of optical modulation by the optical modulator 12 is given as an inner product of a difference wave vector between a wave vector of the emitted light L1 entering the optical modulator 12 and a wave vector of the reference light L2 emitted from the optical modulator 12, and a vector of the oscillator 30 in the oscillation direction 36. In the present configuration example, the oscillator 30 performs thick slide oscillation. The oscillation is in-plane oscillation, and hence optical modulation cannot be performed even when light vertically enters the surface of the oscillator 30 alone. In view of this, in the present configuration example, the diffraction grating 34 is provided to the oscillator 30. With this, optical modulation is enabled with the principle described below.

The diffraction grating 34 illustrated in FIG. 3 is a blazed diffraction grating. The blazed diffraction grating is a diffraction grating having a step-like cross-sectional shape. The linear grooves 32 in the diffraction grating 34 are provided to have an extension direction orthogonal to the oscillation direction 36.

A drive signal Sd is supplied (an AC voltage is applied) from the oscillation circuit 54 illustrated in FIG. 1 and FIG. 2 to the oscillator 30 illustrated in FIG. 3, the oscillator 30 oscillates. Electric power (drive power) required for oscillation of the oscillator 30 is not particularly limited, and is small, approximately from 0.1 μW to 100 mW. Thus, the drive signal Sd output from the oscillation circuit 54 can be used for oscillation of the oscillator 30, without amplification.

Further, an optical modulator in the related art requires a structure for maintaining a temperature of the optical modulator in some cases. Thus, it is difficult to reduce its volume. Further, the optical modulator in the related art consumes a large amount of electric power, and hence has a difficulty in reducing a size of a laser interferometer and reducing power consumption. In view of this, in the present configuration example, the oscillator 30 has an extremely small volume, and electric power required for oscillation is small. Thus, the laser interferometer 1 can be easily reduced in size, and electric power can be easily saved.

1.1.5.2. Formation Method of Diffraction Grating

A formation method of the diffraction grating 34 is not particularly limited. As one example, a die is produced by a method using a ruling engine, and the grooves 32 are formed by a nano-inprint method on electrodes deposited on the surface of the oscillator 30 of the crystal AT oscillator. Here, formation takes place on the electrodes because, in principle, thick slide oscillation with high quality can be caused on the electrodes in a case of the crystal AT oscillator. Note that the grooves 32 are formed on the electrodes in a non-limited manner, and may be formed on a surface of a material forming a non-electrode part. Further, in place of the nano-inprint method, a processing method using light exposure and etching, an electron beam lithography method, a focused ion beam (FIB) processing method, or the like may be used.

Further, a diffraction grating may be formed of a resist material on a chip of the crystal AT oscillator, and a metal film or a mirror film such as a dielectric multilayer film may be provided thereon. When a metal film or a mirror film is provided, reflectance of the diffraction grating 34 can be improved.

Further, a resist film is formed on a chip or a wafer of the crystal AT oscillator, and is subjected to processing such as etching. Then, the resist film is removed. After this, a metal film or a mirror film may be formed on the resultant processed surface. In this case, the resist material is removed, and hence an influence of the resist material such as moisture absorption can be eliminated. Thus, chemical stability of the diffraction grating 34 can be improved. Further, a film formed of metal having high conductivity such as Au and Al is provided. With this, the film can be used as an electrode for driving the oscillator 30.

Note that the diffraction grating 34 may be formed by using a technique such as anodic porous alumina (porous alumina).

1.1.5.3. Other Configuration Examples of Optical Modulator

The oscillator 30 is not limited to a crystal oscillator, and may be a Si oscillator, a surface acoustic wave (SAW) device, a ceramic oscillator, or the like.

Figure 4:
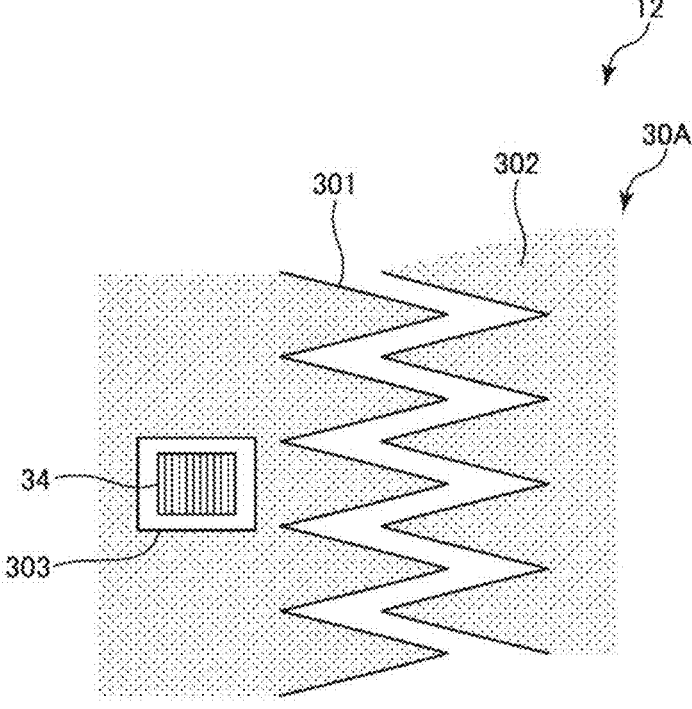
FIG. 4 is a plan view illustrating part of a second configuration of the optical modulator.
Figure 5:
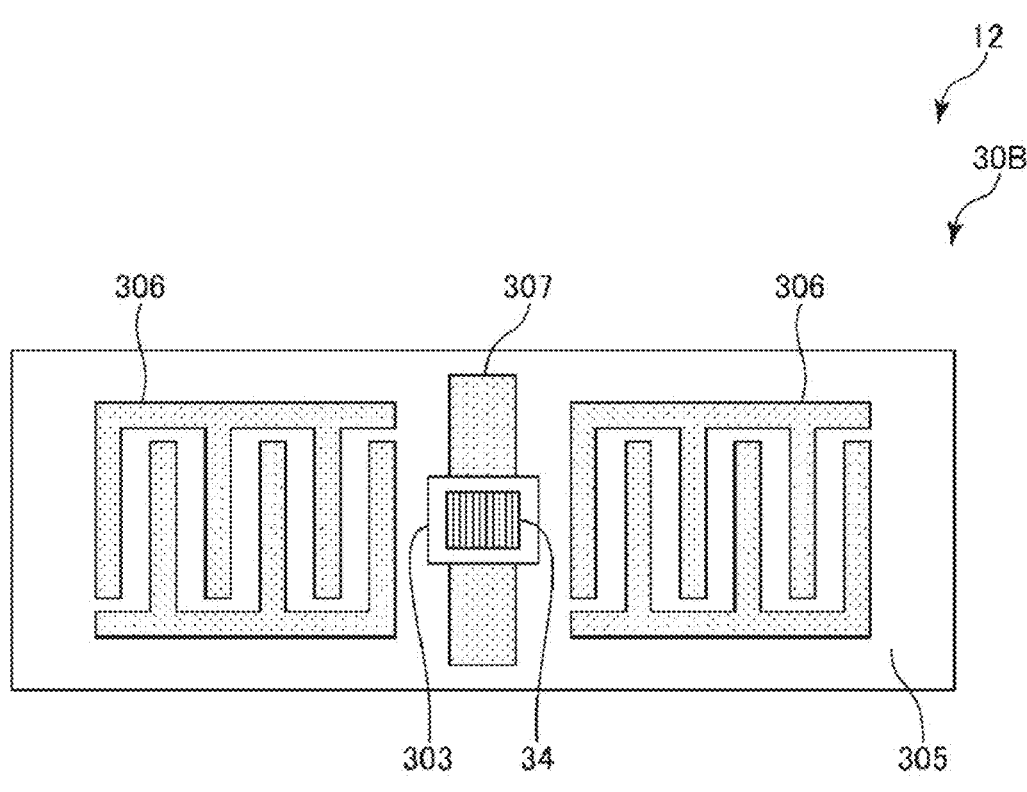
FIG. 5 is a plan view illustrating a third configuration example of the optical modulator.

FIG. 4 a plan view illustrating part of a second configuration of the optical modulator 12. FIG. 5 is a plan view illustrating a third configuration example of the optical modulator 12.

An oscillator 30A illustrated in FIG. 4 is an Si oscillator produced from a Si base board by using a MEMS technique. MEMS stands for and indicates a Micro Electro Mechanical System.

The oscillator 30A includes a first electrode 301 and a second electrode 302 that are adjacent to each other in the same plane at an interval, a diffraction grating placement portion 303 provided at the first electrode 301, and the diffraction grating 34 provided at the diffraction grating placement portion 303. The first electrode 301 and the second electrode 302 oscillate by, for example, an electro-static attraction force as a drive force, so as to repeatedly approach and move away from each other along a right-and-left direction in FIG. 4, specifically, along an axis coupling the first electrode 301 and the second electrode 302 to each other in FIG. 4. With this, the diffraction grating 34 can be provided with in-plane oscillation. An oscillation frequency of the Si oscillator is approximately from 1 kHz to a several hundred MHz, for example.

The oscillator 30B illustrated in FIG. 5 is a SAW device using a surface wave. SAW stands for and indicates a Surface Acoustic Wave.

The oscillator 30B includes a piezoelectric base board 305, a comb-like electrode 306 provided at the piezoelectric base board 305, a ground electrode 307, the diffraction grating placement portion 303, and the diffraction grating 34. When an AC voltage is applied to the comb-like electrode 306, a surface acoustic wave is excited to oscillate due to an inverse piezoelectric effect. With this, the diffraction grating 34 can be provided with in-plane oscillation. An oscillation frequency of the SAW device is approximately a several hundred MHz to a several GHz, for example.

With the devices described above, optical modulation is also enabled similarly to the crystal AT oscillator with the principle described below by providing the diffraction grating 34.

Meanwhile, when the oscillator 30 is a crystal oscillator, a modulation signal with high accuracy can be generated by using a Q value of the crystal, which is extremely high. The Q value is an index indicating sharpness of a peak of resonance. Further, the crystal oscillator is unlikely to be affected by disturbance. Therefore, when a modulation signal modulated by the optical modulator 12 including the crystal oscillator is used, a sample signal derived from the object 14 to be measured can be obtained at high accuracy.

1.1.5.4. Optical Modulation by Oscillator

Next, the principle of modulating light by using the oscillator 30 is described.

Figure 6:
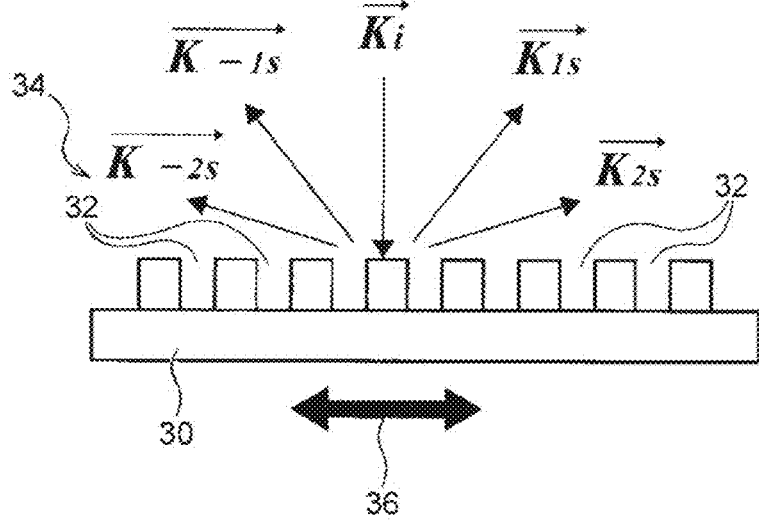
FIG. 6 is a conceptual view illustrating that a plurality of beams of diffracted light are generated when incident light $K_i$ enters a surface of an oscillator in a vertical direction.

FIG. 6 is a conceptual view illustrating that a plurality of beams of diffracted light are generated when incident light $K_i$ enters a surface of the oscillator 30 in a vertical direction.

When the incident light $K_i$ enters the diffraction grating 34 performing thick slide oscillation along the oscillation direction 36, a plurality of beams of diffracted light $K_{ns}$ are generated due to a diffraction phenomenon as illustrated in FIG. 6. n is an order in the diffracted light $K_{ns}$, and n=0, ±1, ±2, . . . . Note that the diffraction grating 34 illustrated in FIG. 6 is illustrated as a diffraction grating having repeated recesses and protrusions as another example of the diffraction grating, in place of the blazed diffraction grating illustrated in FIG. 3. Further, in FIG. 6, illustration of the diffracted light $K_{0s}$ is omitted.

In FIG. 6, the incident light $K_i$ enters the surface of the oscillator 30 in a vertical direction, but the incident angle is not particularly limited thereto. The incident angle may be set so that the incident light $K_i$ obliquely enters the surface of the oscillator 30. In a case of oblique incidence, advancement directions of the diffracted light $K_{ns}$ correspondingly differ.

Note that, depending on designing of the diffraction grating 34, light of a high order of |n|≥2 does not appear in some cases. In view of this, in order to obtain a modulation signal in a stable manner, it is desired that |n|=1. In other words, in the laser interferometer 1 in FIG. 2, the optical modulator 12 of a frequency shifter type is preferably arranged so that a ±1st-order diffracted light is used as the reference light L2. With this arrangement, the laser interferometer 1 can perform stable measurement.

Meanwhile, when light of a high order of |n|≥2 appears from the diffraction grating 34, the optical modulator 12 may be arranged so that any diffracted light of 2nd-order and higher diffracted light is used as the reference light L2, in place of the first diffracted light. With this, diffracted light of a higher order can be utilized. Thus, a higher frequency and size reduction of the laser interferometer 1 can be achieved.

In the present exemplary embodiment, as one example, the optical modulator 12 is configured so that an angle formed between the advancement direction of the incident light $K_i$ entering the optical modulator 12 and the advancement direction of the reference light L2 emitted from the optical modulator 12 is 180 degrees. Three examples are described below.

Figure 7:
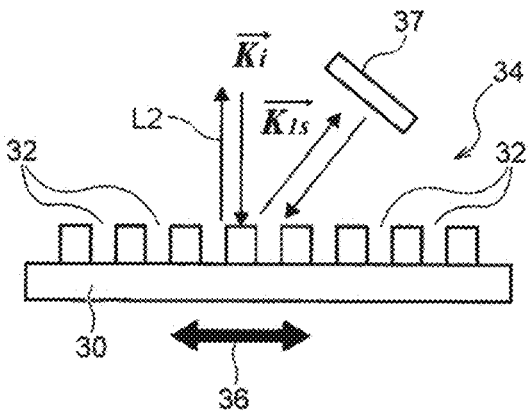
FIG. 7 is a conceptual view illustrating the optical modulator configured so that an angle formed between an advancement direction of the incident light $K_i$ and an advancement direction of reference light L2 is 180 degrees.
Figure 8:
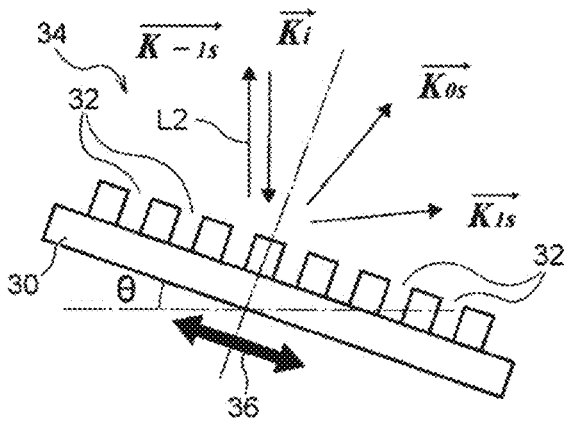
FIG. 8 is a conceptual view illustrating the optical modulator configured so that the angle formed between the advancement direction of the incident light $K_i$ and the advancement direction of the reference light L2 is 180 degrees.
Figure 9:
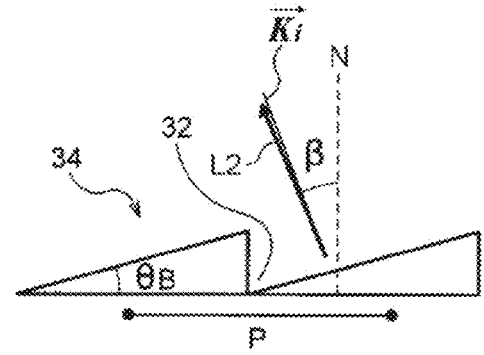
FIG. 9 is a conceptual view illustrating the optical modulator configured so that the angle formed between the advancement direction of the incident light $K_i$ and the advancement direction of the reference light L2 is 180 degrees.

Each of FIG. 7 to FIG. 9 is a conceptual view illustrating the optical modulator 12 configured so that the angle formed between the advancement direction of the incident light $K_i$ and the advancement direction of the reference light L2 is 180 degrees.

The optical modulator 12 illustrated in FIG. 7 includes a mirror 37 in addition to the oscillator 30. The mirror 37 is arranged so as to reflect the diffracted light $K_{is}$ back to the diffraction grating 34. In this case, an angle formed between an incident angle of the diffracted light $K_{is}$ with respect to the mirror 37 and a reflection angle at the mirror 37 is 180 degrees. As a result, the diffracted light $K_{is}$ that is emitted from the mirror 37 back to the diffraction grating 34 is diffracted again by the diffraction grating 34, and advances in a direction opposite to the advancement direction of the incident light $K_i$ entering the optical modulator 12. Thus, when the mirror 37 is added, the above-mentioned condition that the angle formed between the advancement direction of the incident light $K_i$ and the advancement direction of the reference light L2 is 180 degrees can be satisfied.

Further, when advancing via the mirror 37 as described above, the reference light L2 generated by the optical modulator 12 is subjected to frequency modulation twice. Therefore, when the mirror 37 is used together, frequency modulation at a higher frequency can be enabled as compared to a case in which the oscillator 30 is used alone.

In FIG. 8, the oscillator 30 is inclined as compared to the arrangement in FIG. 6. The inclination angle θ in this case is set so as to satisfy the above-mentioned condition that the angle formed between the advancement direction of the incident light $K_i$ and the advancement direction of the reference light L2 is 180 degrees.

The diffraction grating 34 illustrated in FIG. 9 is a blazed diffraction grating having a blaze angle $\theta_B$. Further, when the incident light $K_i$ that advances at an incident angle B with respect to a normal line N of the surface of the oscillator 30 enters the diffraction grating 34, the reference light L2 comes back at the same angle as the blaze angle $\theta_B$ with respect to the normal line N. Therefore, when the incident angle B is set equal to the blaze angle $\theta_B$, the above-mentioned condition that the angle formed between the advancement direction of the incident light $K_i$ and the advancement direction of the reference light L2 is 180 degrees can be satisfied. In this case, the above-mentioned condition can be satisfied without using the mirror 37 illustrated in FIG. 7 or inclining the oscillator 30 as illustrated in FIG. 8. Thus, a higher frequency and size reduction of the laser interferometer 1 can be achieved. Particularly, in a case of the blazed diffraction grating, the arrangement that satisfies the above-mentioned condition is referred to as "Littrow arrangement", which also has an advantageous point for particularly improving diffraction efficiency of the diffracted light.

Note that a pitch P in FIG. 9 indicates a pitch of the blazed diffraction grating, and the pitch P is set to 1 μm, as one example. Further, the blaze angle $\theta_B$ is set to 25 degrees. In this case, in order to satisfy the above-mentioned condition, the incident angle B of the incident light $K_i$ with respect to the normal line N is only required to be set to 25 degrees.

1.1.5.5. Package Structure

Figure 10:
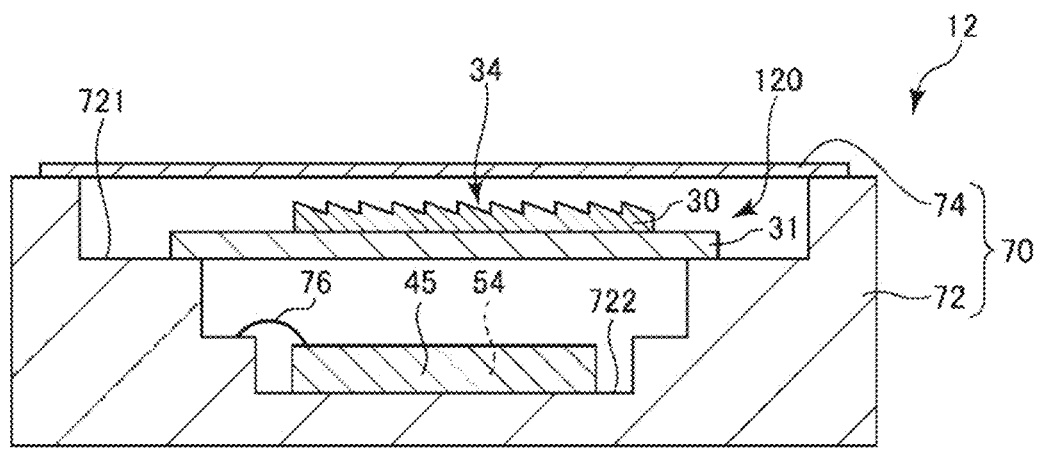
FIG. 10 is a cross-sectional view illustrating the optical modulator having a package structure.

FIG. 10 is a cross-sectional view illustrating the optical modulator 12 having a package structure.

The optical modulator 12 illustrated in FIG. 10 includes a container 70 being a casing body, the optical modulation oscillator 120 accommodated in the container 70, and a circuit element 45 forming the oscillation circuit 54. Note that the container 70 is hermetically sealed in, for example, a pressure-reduced atmosphere such as a vacuum or an inert gas atmosphere such as nitrogen and argon.

As illustrated in FIG. 10, the container 70 includes a container main body 72 and a lid 74. Of those, the container main body 72 includes a first recessed portion 721 that is provided inside and a second recessed portion 722 that is provided an inner side of the first recessed portion 721 and is deeper than the first recessed portion 721. For example, the container main body 72 is formed of a ceramic material, a resin, material, or the like. Further, although not illustrated, the container main body 72 includes an inner terminal provided at the inner surface, an outer terminal provided at the outer surface, a wiring line coupling the inner terminal and the outer terminal to each other, and the like.

Further, an opening of the container main body 72 is closed with the lid 74 through a sealing member (not illustrated) such as a sealing ring, glass with a low fusion point, and the like. As the constituent material for the lid 74, a material capable of transmitting laser light, for example, a glass material or the like is used.

The optical modulation oscillator 120 is arranged on the bottom surface of the first recessed portion 721. The optical modulation oscillator 120 is supported on the bottom surface of the first recessed portion 721 through a joining member (not illustrated). Further, the inner terminal of the container main body 72 and the optical modulation oscillator 120 are electrically coupled to each other through a conductive material (not illustrated) such as a bonding wire and joining metal.

The circuit element 45 is arranged on the bottom surface of the second recessed portion 722. The circuit element 45 is electrically coupled to the inner terminal of the container main body 72 through a bonding wire 76. With this, the optical modulation oscillator 120 and the circuit element 45 are also electrically coupled to each other through the wiring line included in the container main body 72. Note that the circuit element 45 may be provided with a circuit other than the oscillation circuit 54 described later.

When a package structure described above is adopted, the optical modulation oscillator 120 and the circuit element 45 can overlap with each other, and hence a physical distance therebetween can be shortened. With this, the length of the wiring line between the optical modulation oscillator 120 and the circuit element 45 can be shortened. Thus, a noise can be prevented from entering the drive signal Sd from the outside, or the drive signal Sd can be prevented from being a noise source. Further, the single container 70 can protect both the optical modulation oscillator 120 and the circuit element 45 from the external environment. Thus, while reducing a size of the sensor head unit 51, reliability of the laser interferometer 1 can be improved.

Note that the structure of the container 70 is not limited to the illustrated structure. For example, the optical modulation oscillator 120 and the circuit element 45 may have individual package structures. Further, although not illustrated, the container 70 may accommodate other circuit elements forming the oscillation circuit 54. Note that the container 70 may be provided as required, and may be omitted.

1.2 Oscillation Circuit

As illustrated in FIG. 1, the oscillation circuit 54 outputs the drive signal Sd that is input to the optical modulator 12 of the optical system 50. Further, the oscillation circuit 54 outputs a reference signal Ss that is input to the demodulation circuit 52.

A circuit used as the oscillation circuit 54 is not particularly limited as long as the circuit enables oscillation of the oscillator 30, and circuits with various configurations may be used. As one example of a circuit configuration, FIG. 11 is a circuit diagram illustrating a configuration of a single step inverter oscillation circuit.

Figure 11:
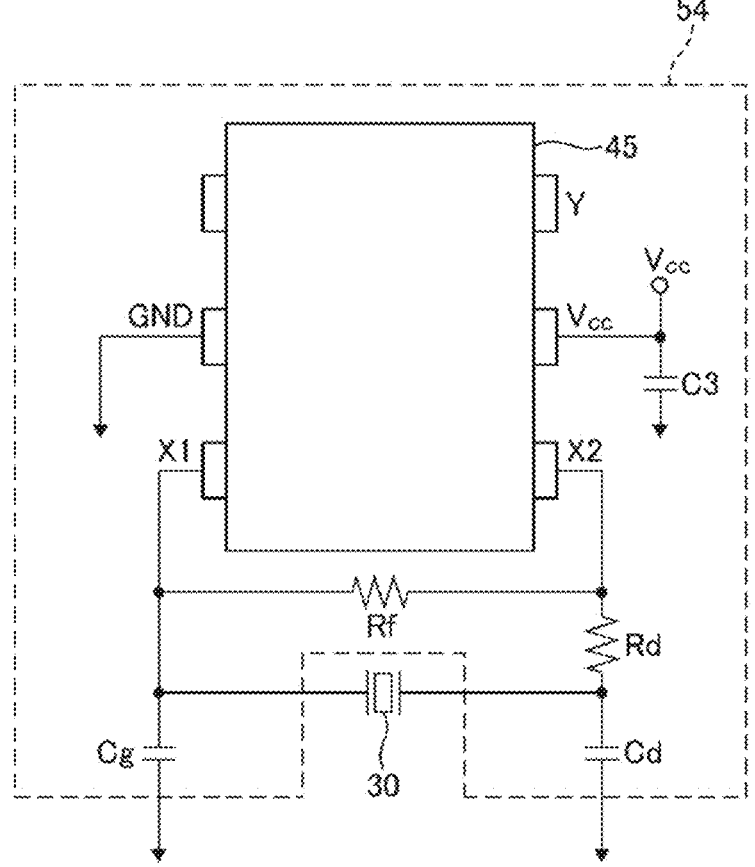
FIG. 11 is a circuit diagram illustrating a configuration of a single step inverter oscillation circuit.

The oscillation circuit 54 illustrated in FIG. 11 includes the circuit element 45, a feedback resister Rf, a limit resistor Rd, a first capacitor Cg, a second capacitor Cd, and a third capacitor C3.

The circuit element 45 is an inverter IC. A terminal X1 and the terminal X2 of the circuit element 45 are terminals respectively coupled to inverters in the circuit element 45. A terminal GND is coupled to a ground potential, and a terminal Vcc is coupled to a power source potential. A terminal Y is a terminal for oscillation output.

The first capacitor Cg is coupled between the terminal X1 and a ground potential. Further, between the terminal X2 and the ground potential, the limit resistor Rd and the second capacitor Cd that are coupled to each other in series are coupled in the stated order from the terminal X2 side. Further, one end of the feedback resister Rf is coupled between the terminal X1 and the first capacitor Cg, and the other end of the feedback resister Rf is coupled between the terminal X2 and the limit resistor Rd.

Further, one end of the oscillator 30 is coupled between the first capacitor Cg and the feedback resister Rf, and the other end of the oscillator 30 is coupled between the second capacitor Cd and the limit resistor Rd. With this, the oscillator 30 is a signal source of the oscillation circuit 54.

Figure 12:
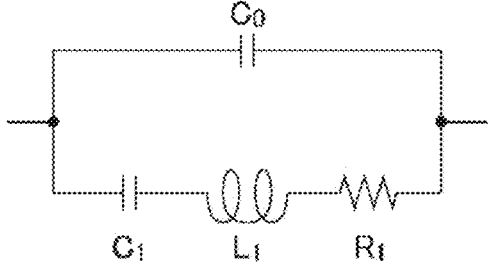
FIG. 12 is an example of an LCR equivalent circuit of the oscillator.

FIG. 12 is an example of an LCR equivalent circuit of the oscillator 30.

As illustrated in FIG. 12, the LCR equivalent circuit of the oscillator 30 includes a series capacitance $C_1$, a series inductance $L_1$, an equivalent series resistor $R_1$, and a parallel capacitance $C_0$.

In the oscillation circuit 54 illustrated in FIG. 11, a load capacitance $C_L$ is given in Expression (a) given below, when a capacitance of the first capacitor Cg is Cg and a capacitance of the second capacitor Cd is $C_d$.

[Mathematical Equation 1]

$$C_L = \frac{C_d C_g}{C_d + C_g} \tag{a}$$

Consequently, an oscillation frequency $f_{osc}$ that is output from the terminal Y of the oscillation circuit 54 is given in Expression (b) given below.

[Mathematical Equation 2]

$$f_{osc} = f_Q \sqrt{1 + \frac{C_1}{C_0 + C_L}} \tag{b}$$

$f_Q$ indicates a natural frequency of the oscillator 30.

According to Expression (b) give above, it is understood that the oscillation frequency $f_{osc}$ of the signal output from the terminal Y can be finely adjusted by changing the load capacitance $C_L$ as appropriate.

Further, a difference $\Delta f$ between the natural frequency $f_Q$ of the oscillator 30 and the oscillation frequency $f_{osc}$ of the oscillation circuit 54 is given in Expression (c) given below.

[Mathematical Equation 3]

$$\Delta f = f_{osc} - f_Q = f_Q \left( \sqrt{1 + \frac{C_1}{C_0 + C_L}} - 1 \right) \tag{c}$$

Here, $C_1 \ll C_0$ and $C_1 \ll C_L$. Thus, $\Delta f$ is approximately given in Expression (d) given below.

[Mathematical Equation 4]

$$\Delta f = f_{osc} - f_Q \cong \frac{C_1}{2(C_0 + C_1)} f_Q \tag{d}$$

Therefore, the oscillation frequency $f_{osc}$ of the oscillation circuit 54 is a value corresponding to the natural frequency $f_Q$ of the oscillator 30.

Here, the oscillator 30 is fixed to, for example, the container 70, and receives a thermal expansion stress via the fixing portion. With this, the natural frequency $f_Q$ varies. Further, the oscillator 30 is inclined, and is affected by gravity such as its own weight. With this, the natural frequency $f_Q$ varies.

In in the oscillation circuit 54, even when the natural frequency $f_Q$ varies for those reasons, the oscillation frequency $f_{osc}$ is changed according to the variation based on Expression (d) given above. Specifically, the oscillation frequency $f_{osc}$ is always a value deviated from the natural frequency $f_Q$ by $\Delta f$. With this, oscillation of the oscillator 30 is stabled, and a displacement amplitude $L_0$ can be obtained in a stable manner. When the displacement amplitude $L_0$ can be stabilized, modulation characteristics of the optical modulator 12 can be stabilized. Thus, modulation accuracy of the sample signal in the demodulation circuit 52 can be improved.

As one example, preferably $\Delta f=|f_{osc}-f_Q|\leq3000$ [Hz], and more preferably $\Delta f$ is 600 [Hz].

Note that, in place of the oscillation circuit 54, for example, a signal generation device such as a function generator and a signal generator may be used.

2. Demodulation Circuit

The demodulation circuit 52 executes demodulation processing for demodulating a sample signal derived from the object 14 to be measured, from the photoreception signal output from the photoreceptor 10. For example, the sample signal contains phase information and frequency information. Further, displacement information relating to the object 14 to be measured can be obtained from the phase information, and velocity information relating to the object 14 to be measured can be obtained from the frequency information. When the difference pieces of information can be obtained as described above, functions as a displacement gauge and a velocimeter can be provided. Thus, high functionality of the laser interferometer 1 can be achieved.

A circuit configuration of the demodulation circuit 52 is set according to a demodulation processing method. The optical modulator 12 including the oscillator 30 is used in the laser interferometer 1 according to the present exemplary embodiment. The oscillator 30 is an element that performs simple harmonic oscillation, and hence an oscillation velocity momentarily changes in one period. Thus, a modulation frequency changes with time, and a demodulation circuit in the related art cannot be used as it is.

For example, the demodulation circuit in the related art indicates a circuit that demodulates a sample signal from a photoreception signal containing a modulation signal modulated by using an acousto-optical modulator (AOM). In the acousto-optical modulator, a modulation frequency does not change. Thus, the modulation circuit in the related art is capable of demodulating a sample signal from a photoreception signal containing a modulation signal having an unchanging modulation frequency. However, when the modulation signal with a changing modulation frequency, which is modulated by the optical modulator 12, is contained, the signal cannot be demodulated as it is.

In view of this, the demodulation circuit 52 illustrated in FIG. 1 includes a pre-processing unit 53 and a demodulation processing unit 55. The photoreception signal output from the photoreceptor 10 first passes through the pre-processing unit 53, and then is guided to the demodulation processing unit 55. The pre-processing unit 53 subjects the photoreception signal to pre-processing. With the pre-processing, a signal that can be demodulated by the demodulation circuit in the related art can be obtained. Therefore, in the demodulation processing unit 55, the sample signal derived from the object 14 to be measured is demodulated by a publicly known demodulation method.

2.1. Configuration of Pre-processing Unit

The pre-processing unit 53 illustrated in FIG. 1 includes a first band pass filter 534, a second band pass filter 535, a first delay adjuster 536, a second delay adjuster 537, a multiplier 538, a third band pass filter 539, a first AGC 540, a second AGC 541, and an adder 542. Note that AGC stands for an Auto Gain Control.

Further, a current voltage converter 531 and an ADC 532 are coupled in the stated order from the photoreceptor 10 side between the photoreceptor 10 and the pre-processing unit 53. The current voltage converter 531 is a transimpedance amplifier, and converts a current output from the photoreceptor 10 into a voltage signal. The ADC 532 is an analog-digital converter, and converts an analog signal into a digital signal at a predetermined sampling bit number.

A current output that is output from the photoreceptor 10 is converted into a voltage signal by the current voltage converter 531. The voltage signal is converted into a digital signal by the ADC 532, and is divided into two signals being a first signal S1 and a second signal S2 by a branching unit jp1. In FIG. 1, a path for the first signal S1 is indicated with a first signal path ps1, and a path for the second signal S2 is indicated with a second signal path ps2.

Further, an ADC 533 is coupled between the oscillation circuit 54 and the second delay adjuster 537. The ADC 533 is an analog-digital converter, and converts an analog signal into a digital signal at a predetermined sampling bit number.

Each of the first band pass filter 534, the second band pass filter 535, and the third band pass filter 539 is a filter that selectively transmits a signal in a specific frequency band.

Each of the first delay adjuster 536 and the second delay adjuster 537 is a circuit that adjusts a delay of a signal. The multiplier 538 is a circuit that generates an output signal proportional to a product of the two input signals.

The adder 542 is a circuit that generates an output signal proportional to a sum of the two input signals.

Next, an operation of the pre-processing unit 53 is described along the flows of the first signal S1, the second signal S2, and the reference signal Ss.

The first signal S1 passes through the first band pass filter 534 arranged in the first signal path ps1, and then a group delay is adjusted by the first delay adjuster 536. The group delay adjusted by the first delay adjuster 536 corresponds to a group delay of the second signal S2 due to the second band pass filter 535, which is described later. With this delay adjustment, a delay time period due to passing through the filter circuit can be equalized between the first band pass filter 534 through which the first signal S1 passes and the second band pass filter 535 and the third band pass filter 539 through which the second signal S2 passes. The first signal S1 after passing through the first delay adjuster 536 is input to the adder 542 via the first AGC 540.

The second signal S2 passes through the second band pass filter 535 arranged in the second signal path ps2, and then is input to the multiplier 538. In the multiplier 538, the second signal S2 is multiplied by the reference signal Ss output from the second delay adjuster 537. Specifically, the reference signal Ss that is output from the oscillation circuit 54 and is indicated with $\cos(\omega_m t)$ is subjected to digital conversion by the ADC 533 and to phase adjustment by the second delay adjuster 537, and then is input to the multiplier 538. $\omega_m$ is an angular frequency of the modulation signal from the optical modulator 12, and t is time. Then, the second signal S2 after passing through the third band pass filter 539 is input to the adder 542 via the second AGC 541.

The adder 542 outputs an output signal proportional to a sum of the first signal S1 and the second signal S2, to the demodulation processing unit 55.

2.2. Basic Principle of Pre-Processing

Next, the basic principle of the pre-processing in the pre-processing unit 53 is described. Note that the basic principle referred herein is the principle described in JP-2-38889. Further, in the basic principle, consideration is made on a system in which a frequency is changed to have a sinusoidal wave shape as a modulation signal and displacement of the object 14 to be measured is also changed with simple harmonic oscillation in an optical axis direction. Here, $E_m$, $E_d$, and p are given as below.

[Mathematical Equation 5]

$$E_m = \alpha_m \{\cos(w_0t + \beta \, \sin\omega_mt + \phi_m) + i \, \sin(w_0t + \beta \, \sin\omega_mt + \phi_m)\} \tag{1}$$

$$E_d = \alpha_d \{\cos(w_0t + A \, \sin\omega_dt + \phi_d) + i \, \sin(w_0t + A \, \sin\omega_dt + \phi_d)\} \tag{2}$$

$$\phi = \phi_m - \phi_d \tag{3}$$

In this case, a photoreception signal $I_{PD}$ that is output from the photoreceptor 10 is theoretically expressed in the following expression.

[Mathematical Equation 6]

$$\begin{aligned}
I_{PD} &= \langle |E_m + E_d|^2 \rangle \\
&= \langle |E_m^2 + E_d^2 + 2E_mE_d| \rangle \\
&= a_m^2 + a_0^2 + 2a_ma_d\cos(B\sin\omega_mt - A\sin\omega_0t + \phi)
\end{aligned} \tag{4}$$

Note that $E_m$, $E_d$, $\varphi_m$, $\varphi_d$, $\varphi$, $\omega_m$, $\omega_0$, $a_m$, and $a_d$ are expressed as in the following expression.

Mathematical Equation 7

$E_m$: Electric field component derived from optical modulator $E_d$: Electric field component derived from object to be measured $\phi_m$: Initial phase of modulation signal derived from optical modulator $\phi_d$: Initial phase of sample signal derived from object to be measured $\phi$: Optical path phase difference in laser interferometer $\omega_m$: Angular frequency of modulation signal derived from optical modulator $\omega_d$: Angular frequency of sample signal derived from object to be measured $\omega_0$: Angular frequency of emitted light that is emitted from light source $\alpha_m$: Coefficient $\alpha_d$: Coefficient Further, < > in Expression (4) indicates a time average.

The first member and the second member in Expression (4) given above indicate DC components, and the third member indicates an AC component. When the AC component is indicated with $I_{PD\text{-}AC}$, $I_{PD\text{-}AC}$ is expressed as in the following expression.

[Mathematical Equation 8]

$$\begin{aligned}
I_{PD\text{-}AC} &= 2a_ma_d\cos(B\sin\omega_mt - A\sin\omega_dt + \phi) \\
&= 2a_ma_d\{\cos(B\sin\omega_mt)\cos(A\sin\omega_dt - \phi) + \\
&\quad \sin(B\sin\omega_mt)\sin(A\sin\omega_dt - \phi)\}
\end{aligned} \tag{5}$$

$$A = \frac{f_{dmax}}{f_d} \tag{6}$$

$$B = \frac{f_{mmax}}{f_m} \tag{7}$$

A: Phase shift of sample signal $f_{dmax}$: Doppler frequency shift of sample signal $f_d$: Frequency of sample signal.

B: Phase shift of modulation signal $f_{mmax}$: Doppler frequency shift of modulation signal $f_m$: Frequency of modulation signal Here, the $\nu$ order Bessel function as in the following expression is known.

[Mathematical Equation 9]

$$\cos\{\zeta \, \sin(2\pi f_vt)\} = J_0(\zeta) + 2J_2(\zeta)\cos(2\cdot 2\pi f_vt) + 2J_4(\zeta)\cos(4\cdot 2\pi f_vt) + \ldots \tag{8}$$

$$\sin\{\zeta \, \sin(2\pi f_vt)\} = 2J_1(\zeta)\sin(1\cdot 2\pi f_vt) + 2J_3(\zeta)\sin(3\cdot 2\pi f_vt) + \ldots \tag{9}$$

Series expansion is performed by using Expression (5), Expression (8), and the Bessel function of Expression (9) give above, and the following variation is obtained.

[Mathematical Equation 10]

$$\begin{aligned}
I_{PD\text{-}AC} &= 2\alpha_m\alpha_d[\{J_0(B) + 2J_2(B)\cos(2\cdot\omega_mt) + 2J_4(B)\cos(4\cdot\omega_mt) + \ldots\}\cos(A \, \sin\omega_dt - \phi) - \{2J_1(B)\sin(1\cdot\omega_mt) + 2J_3(B)\sin(3\cdot\omega_mt) + \ldots\}\sin(A \, \sin\omega_dt - \phi)]
\end{aligned} \tag{10}$$

Note that each of $J_0$ (B), $J_1$ (B), $J_2$ (B), is a Bessel coefficient.

When the expansion is performed as described above, it can be theoretically said that a band region corresponding to a specific order can be extracted by the band pass filter.

In view of this, in the pre-processing unit 53 described above, the photoreception signal is subjected to the pre-processing with the following flow, based on this theory.

First, the photoreception signal output from the ADC 532 described above is divided into the two signals including the first signal S1 and the second signal S2 by the branching unit jp1. The first signal S1 passes through the first band pass filter 534. The first band pass filter 534 has a central angular frequency that is set to $\omega_m$. With this, the first signal S1 after passing through the first band pass filter 534 is expressed in the following expression.

[Mathematical Equation 11]

$$\begin{aligned}
I_{pass1} &= J_1(B)\{-\cos(\omega_mt + A\sin\omega_0t - \phi) + \cos(\omega_mt - A\sin\omega_0t + \phi)\} \\
&= -2J_1(B)\sin(\omega_mt)\sin(A\sin\omega_0t - \phi)
\end{aligned} \tag{11}$$

Meanwhile, the second signal S2 passes through the second band pass filter 535. The second band pass filter 535 has a central angular frequency that is set to a value different from the central angular frequency of the first band pass filter 534. Here, as one example, the central angular frequency of the second band pass filter 535 is set to $2\omega_m$. With this, the second signal S2 after passing through the second band pass filter 535 is expressed in the following expression.

[Mathematical Equation 12]

$$\begin{aligned}
I_{BPF2} &= J_2(B)\{\cos(2\cdot\omega_mt)\cdot\cos(A\sin\omega_dt - \phi) \\
&= \frac{1}{2}J_2(B)\{\cos(2\cdot\omega_mt + \cos(A\sin \omega_dt - \phi)) + \cos(2\cdot\omega_mt - \cos(A\sin\omega_dt - \phi))\}
\end{aligned} \tag{12}$$

The second signal S2 after passing through the second band pass filter 535 is multiplied by the reference signal Ss at the multiplier 538. The second signal S2 after passing through the multiplier 538 is expressed in the following expression.

[Mathematical Equation 13]

$$I_{\cos(\omega_m t)} = \frac{1}{2} J_2(B)\{\cos(2 \cdot \omega_m t + A\sin\omega_d t - \phi) + \cos(2 \cdot \omega_m t - A\sin\omega_d t + \phi)\} \cdot \cos(\omega_m t) \tag{13}$$
$$= \frac{1}{2} J_2(B)\{\cos(3 \cdot \omega_m t + A\sin\omega_d t - \phi) + \cos(1 \cdot \omega_m t + A\sin\omega_d t - \phi) + \cos(3 \cdot \omega_m t - A\sin\omega_d t + \phi) + \cos(1 \cdot \omega_m t - A\sin\omega_d t - \phi)\}$$

The second signal S2 after passing through the multiplier 538 passes through the third band pass filter 539. The third band pass filter 539 has a central angular frequency that is set to the same value as the central angular frequency of the first band pass filter 534. Here, as one example, the central angular frequency of the third band pass filter 539 is set to $\Omega_m$. With this, the second signal S2 after passing through the third band pass filter 539 is expressed in the following expression.

[Mathematical Equation 14]

$$I_{pass} = \frac{1}{2} J_2(B)\{\cos(\omega_m t + A\sin\omega_d t - \phi) + \cos(\omega_m t - A\sin\omega_d t - \phi)\} \tag{14}$$
$$= J_2(B)\cos(\omega_m t)\cos(A\sin\omega_d t - \phi)$$

After this, the first signal S1 expressed in Expression (11) give above is subjected to phase adjustment by the first delay adjuster 536 and to amplitude adjustment by the first AGC 540.

Further, the second signal S2 expressed in Expression (14) given above is also subjected to amplitude adjustment by the second AGC 541, and the amplitude of the second signal S2 is aligned with respect to the amplitude of the first signal S1.

Further, the first signal S1 is added to the second signal S2 by the adder 542. The added result is expressed in the following expression.

[Mathematical Equation 15]

$$I_{53} = \cos(\omega_m t + A\sin\omega_d t - \phi) \tag{15}$$

As in Expression (15) given above, unnecessary members are eliminated as a result of adding, and necessary members can be extracted. The result is input to the demodulation processing unit 55.

2.3. Configuration of Demodulation Processing Unit

The demodulation processing unit 55 executes demodulation processing for demodulating the sample signal derived from the object 14 to be measured, from the signal output from the pre-processing unit 53. The demodulation processing is not particularly limited, and a publicly known quadrature detection method is given as an example. The quadrature detection method is a method of executing the demodulation processing by performing an operation of mixing an input signal with an outside signal orthogonal to the input signal.

The demodulation processing unit 55 illustrated in FIG. 1 is a digital including a multiplier 551, a multiplier 552, a phase shifter 553, a first low pass filter 555, a second low pass filter 556, a divider 557, an arc tangent calculator 558, and an output circuit 559.

2.4. Demodulation Processing by Demodulation Processing Unit

In the demodulation processing, first, a signal output from the pre-processing unit 53 is divided into two signals by a branching unit jp2. The multiplier 551 multiplies one signal after division by the reference signal Ss that is output from the oscillation circuit 54 and is indicated with $\cos(\omega_m t)$. The multiplier 552 multiplies the other signal after division by a signal indicated with $-\sin(\omega_m t)$. The signal is obtained by shifting, by the phase shifter 553, the phase of the reference signal Ss output from the oscillation circuit 54, by $-90$ degrees. The reference signal Ss and the signal obtained by shifting the phase of the reference signal Ss are signals having phases deviated from each other by 90 degrees.

The signal after passing through the multiplier 551 passes through the first low pass filter 555, and then is input to the divider 557 as a signal x. The signal after passing through the multiplier 552 passes through the second low pass filter 556, and then is input to the divider 557 as a signal y. The divider 557 divides the signal y by the signal x, and the output y/x passes through the arc tangent calculator 558. With this, an output atan(y/x) is obtained.

After this, the output atan(y/x) passes through the output circuit 559. With this, a phase $\varphi_d$ being information derived from the object 14 to be measured can be obtained. The output circuit 559 executes phase unwrapping processing to perform phase connection when adjacent points have a phase jump of $2\pi$. The displacement information relating to the object 14 to be measured can be calculated from the phase information output from the demodulation processing unit 55. With this, a displacement gauge that measures displacement of the object 14 to be measured can be achieved. Further, the velocity information can be obtained from the displacement information. With this, a velocimeter that measures a velocity of the object 14 to be measured can be achieved.

The circuit configuration of the demodulation processing unit 55 is described above. The circuit configuration of the digital circuit described above is merely an example, and is not limited thereto. Further, the demodulation processing unit 55 is not limited to a digital circuit, and may be an analog circuit. The analog circuit may include an F/V converter circuit and a AZ counter.

Further, the circuit configuration of the demodulation processing unit 55 described above may obtain the frequency information derived from the object 14 to be measured. The velocity information relating to the object 14 to be measured can be calculated based on the frequency information.

2.5. Relationship between Demodulation Processing and Oscillation Condition of Oscillator The oscillation condition of the oscillator 30 has an influence on demodulation accuracy of the sample signal in the demodulation processing. The B value contained in Expression (7) given above is phase shift of the modulation signal. When the B value is small, intensity of the AC component $I_{PD\text{-}AC}$ of the photoreception signal $I_{PD}$ output from the photoreceptor 10 is significantly reduced, depending on an initial optical path phase difference in the laser interferometer 1. This problem is described below in more detail.

The intensity of the AC component $I_{PD\text{-}AC}$ of the photoreception signal $I_{PD}$ output from the photoreceptor 10 contains cos $(\psi_m - \psi_d + \varphi_0)$, based on Expression (5) given above. Here, $\psi_m$ is a phase of the modulation signal derived from the optical modulator 12, $\psi_d$ is a phase of the sample signal derived from the object 14 to be measured, and $\varphi_0$ is a difference between an initial phase of the optical path 20 and an initial phase of the optical path 22, that is, an initial optical path phase difference in the laser interferometer 1. The phase $\psi_m$ is expressed by $\psi_m = B \sin(\omega_m t)$, based on Expression (5) given above. Further, herein, the phase $\psi_d = 0$.

Figure 13:
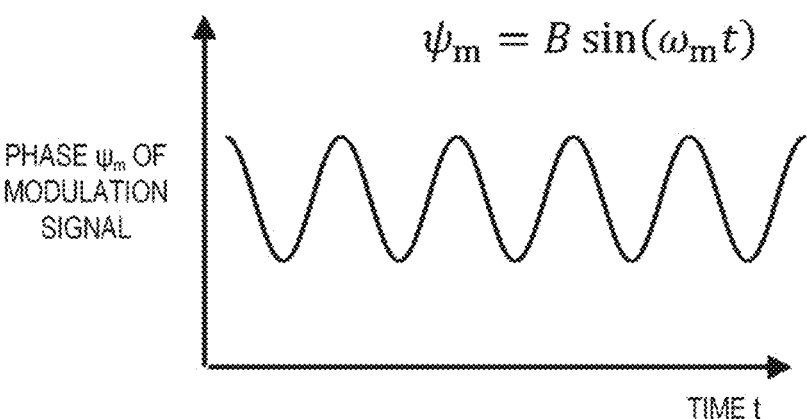
FIG. 13 is a conceptual view illustrating a temporal change of a phase $\psi_m$ of a modulation signal derived from the optical modulator.

FIG. 13 is a conceptual view illustrating a temporal change of the phase $\psi_m$ of the modulation signal derived from the optical modulator 12. As described above, the phase $\psi_m$ is expressed by $\psi_m = B \sin(\omega_m t)$, using the B value described above. Therefore, the temporal change of the phase $\psi_m$ of the modulation signal is expressed in a sinusoidal wave shape as illustrated in FIG. 13.

Figure 14:
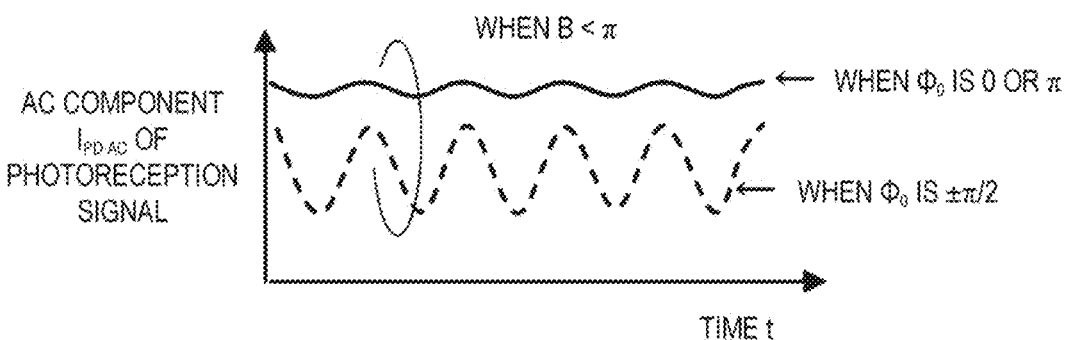
FIG. 14 is a view illustrating how each parameter has an influence on a waveform of an alternating-current component $I_{PD\text{-}AC}$ of a photoreception signal $I_{PD}$.
Figure 14:
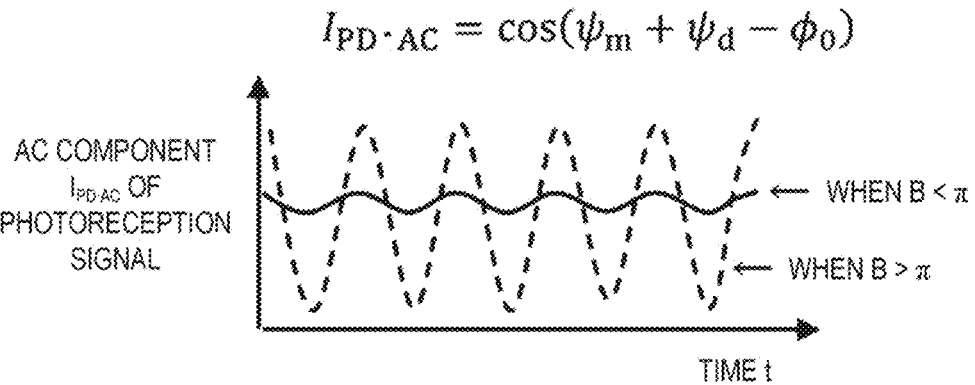

FIG. 14 is a view illustrating how each parameter has an influence on the waveform of the AC component $I_{PD-AC}$ of the photoreception signal $I_{PD}$.

In FIG. 14, the upper graph shows one example of the waveform of the AC component $I_{PD-AC}$ of the photoreception signal $I_{PD}$ when the B value is relatively small, specifically, the B value is smaller than n, for example.

In a case in which the B value is smaller than $\pi$, when the initial optical path phase difference $\varphi_0$ is a specific value such as 0 and $\pi$, intensity of the AC component $I_{PD-AC}$ of the photoreception signal $I_{PD}$ is significantly reduced. In this case, demodulation accuracy in the demodulation processing is degraded, and accuracy of the displacement information and the velocity information that are finally obtained is degraded. Meanwhile, in a case in which the initial optical path phase difference $\varphi_0$ is a specific value such as $\pm\pi/2$, even when the B value is smaller than $\pi$, intensity of the AC component $I_{PD-AC}$ of the photoreception signal $I_{PD}$ is relatively high. Therefore, there is a problem in that, when the B value is relatively small, modulation accuracy is readily affected by the initial optical path phase difference $\varphi_0$ in the laser interferometer 1.

In FIG. 14, the lower graph shows one example of the waveform of the AC component $I_{PD-AC}$ of the photoreception signal $I_{PD}$ in a case where the B value is relatively small and the B value is relatively large, when the initial optical path phase difference $\varphi_0$ is equal.

As understood from the waveform, for example the intensity of the AC component $I_{PD-AC}$ of the photoreception signal $I_{PD}$ is higher when the B value is larger than n, as compared to a case in which the B value is smaller than n. Therefore, when the B value is increased, the intensity of the AC component $I_{PD-AC}$ of the photoreception signal $I_{PD}$ is less likely to be affected by the initial optical path phase difference $\varphi_0$ in the laser interferometer 1.

The B value is a ratio of a Doppler frequency shift $f_{max}$ of the modulation signal with respect to the frequency $f_m$ of the modulation signal. Further, for example, when the oscillator 30 is used at a posture inclined at the inclination angle $\theta$ as illustrated in FIG. 8, the B value of the modulation signal generated by the oscillator 30 is expressed in Expression (16) given below.

[Mathematical Equation 16]

$$B = \frac{4\pi L_q}{\lambda} \sin\theta \tag{16}$$

In Expression (16) given above, $\lambda$ is a wavelength of the emitted light L1, and Lq is an amplitude value of displacement of the oscillator 30. As understood from Expression (16) given above, the B value depends on the amplitude value Lq of the displacement of the oscillator 30. Thus, when the amplitude value Lq of the displacement of the oscillator 30 is increased, the B value can be increased.

Particularly, when the diffraction grating 34 provided to the oscillator 30 is provided in the above-mentioned Littrow arrangement, Expression (17) given below is satisfied.

[Mathematical Equation 17]

$$\sin\theta = \frac{n\lambda}{2P} \tag{17}$$

In Expression (17) given above, n is an order of diffraction, and P is a pitch of the diffraction grating 34. Based on Expression (16) and Expression (17) given above, Expression (18) given below is satisfied.

[Mathematical Equation 18]

$$B = \frac{2\pi L_q}{P} n \tag{18}$$

As understood from Expression (18) given above, even in a case of the Littrow arrangement, the B value depends on the amplitude value Lq of the displacement of the oscillator 30. Thus, when the amplitude value Lq of the displacement of the oscillator 30 is increased, the B value can be increased.

Note that, in FIG. 8, the oscillator 30 that performs in-plane oscillation is used at an inclined posture, but the oscillator 30 may be an element that performs out-of-plane oscillation. The B value in such a case is expressed in Expression (19) given below.

[Mathematical Equation 19]

$$B = \frac{4\pi L_q}{\lambda} \tag{19}$$

As understood from Expression (19) given above, in a case of out-of-plane oscillation, the B value also depends on the amplitude value Lq of the displacement of the oscillator 30. Thus, when the amplitude value Lq of the displacement of the oscillator 30 is increased, the B value can be increased.

In view of the above-mentioned relationship between the B value and the amplitude value Lq of the displacement, the applicants have been conducting a diligent study on a method of increasing the amplitude value Lq of the displacement. As a result, the applicants have found out that there is established a relationship between an amplitude value of a current is applied to the oscillator 30 and the amplitude value Lq of the displacement when the oscillator 30 oscillates. Further, it has been also found out that the amplitude value Lq of the displacement can be efficiently and stably increased by optimizing the amplitude value of the current. Thus, the present disclosure is achieved.

Specifically, the laser interferometer 1 according to the exemplary embodiment includes the light source 2, the polarized beam splitter 4 (optical divider), the optical modulator 12, the photoreceptor 10, and the demodulation circuit 52. The light source 2 emit laser light. The polarized beam splitter 4 divides the laser light emitted from the light source 2, into the optical path 20 (first optical path) and the optical path 22 (second optical path). The optical modulator 12 includes the oscillator 30 that is provided to the optical path 20 and oscillates when a current is applied, and uses the oscillator 30 to modulate the laser light. The photoreceptor 10 receives the laser light that is reflected by the object 14 to be measured, which is provided to the optical path 22, and outputs the photoreception signal. the demodulation circuit 52 demodulates the sample signal (Doppler signal) derived from the object 14 to be measured, from the photoreception signal, based on the reference signal Ss and the modulation signal derived from the optical modulator 12.

In the present exemplary embodiment, particularly, the laser light emitted from the light source 2 is the emitted light L1, the laser light that is modulated by the optical modulator 12 and contains the modulation signal is the reference light L2, and the laser light that is reflected by the object 14 to be measured and contains the sample signal (Doppler signal) is the object light L3. Further, the photoreceptor 10 receives interference light of the object light L3 and the reference light L2, and the demodulation circuit 52 demodulates the sample signal contained in the object light L3, based on reference signal Ss and the modulation signal contained in the reference light L2.

In the laser interferometer 1 as described above, Iq and f are set so that Iq/f≤1×10⁻⁷ wherein the amplitude value of the current applied to the oscillator 30 that is oscillating is Iq [A] and the oscillation frequency of the oscillator 30 is f [Hz].

With this, the probability of demodulating the sample signal at minimum necessary accuracy in the laser interferometer 1 is higher without depending on the oscillation condition of the oscillator 30. In other words, when Iq/f falls within the above-mentioned range, excitation electric power (drive level) of the oscillator 30 falls within an appropriate range. Thus, abnormal oscillation is suppressed in the oscillator 30, a reduction of the B value can be prevented. Note that, when Iq/f exceeds the upper limit value, the drive level of the oscillator 30 is excessively large. Thus, a non-linear phenomenon such as increase in equivalent series resistance is caused. When the equivalent series resistance is increased, the amplitude value Iq of the current is reduced. With this, the B value is reduced.

Further, the oscillation circuit 54 enables oscillation of a Si oscillator and a ceramic oscillator, as well as a crystal oscillator.

When the oscillator 30 is a crystal oscillator, preferably 2×10¹⁰≤Iq/f≤1×10⁻⁷, more preferably 2×10⁻⁹ Iq/f≤3×10⁻⁸, further more preferably 4×10⁻⁹≤Iq/f≤3×10⁻⁸, wherein the amplitude value of the current applied to the crystal oscillator is Iq [A], and the oscillation frequency of the crystal oscillator is f [Hz].

When Iq/f falls within the above-mentioned range, the sample signal derived from the object 14 to be measured can be demodulated at higher accuracy without depending on the oscillation condition of the crystal oscillator. In other words, a problem of degrading demodulation accuracy due to the oscillation condition is less likely to arise. With this, the laser interferometer 1 capable of demodulating the sample signal more accurately as compared to the related art can be achieved.

Note that, when Iq/f is less than the above-mentioned lower limit value, the amplitude value Lq of the displacement of the crystal oscillator is not sufficient, depending on the oscillation condition. As a result, there may be a risk of reducing the B value. With this, there may be a risk in that sufficient demodulation accuracy cannot be obtained. In contrast, when Iq/f exceeds the above-mentioned upper limit value, the drive level of the crystal oscillator is excessive, and the amplitude value Iq of the current is reduced. Thus, there may be a risk of reducing the B value. In this case, there may also be a risk in that sufficient demodulation accuracy cannot be obtained.

Note that the amplitude value Iq of the current applied to the oscillator 30 that is oscillating is obtained by mounting a current probe directly after the oscillator 30 illustrated in FIG. 11, displaying an excitation current waveform with an oscilloscope, and calculating an effective current value from the waveform.

Here, the above-mentioned relationship between the amplitude value Iq of the current and the B value can be theoretically described below.

A differential equation that theoretically expresses the LCR equivalent circuit of the oscillator 30 has correspondence with a differential equation that theoretically expresses a mechanical oscillation system of a spring system. Based on the correspondence, the current applied to the oscillator 30 corresponds to a velocity of the mechanical oscillation system, and an electric charge applied to the oscillator 30 corresponds to displacement of the mechanical oscillation system.

The electric charge is given by time-integrating the current. Therefore, a relationship among the B value, the amplitude value Lq of the displacement of the oscillator 30, and the current applied to the oscillator 30 is expressed in Expression (20) given below.

[Mathematical Equation 20]

$$B \propto L_q \propto \int I dt \, \text{Amplitude value of } I dt \tag{20}$$

When change of the current with respect to time in the oscillation circuit 54 has a sinusoidal wave shape, the relationship among the B value, the amplitude value Lq of the displacement of the oscillator 30, and the current applied to the oscillator 30 is expressed in Expression (21) given below.

[Mathematical Equation 21]

$$B \propto L_q \propto \int I dt \, \text{ Amplitude value of } I dt = \frac{I_q}{\omega_m} = \frac{I_q}{2\pi f_m} \tag{21}$$

When the load capacitance $C_L$ is swung, change of the angular frequency $\omega_m$ of the modulation signal derived from the optical modulator 12 is at a level of a several hundred Hz, which can be regarded as almost non-existence. For this reason, it is described that the B value and the amplitude value Lq of the displacement are proportional to the amplitude value Iq of the current.

In this case, a factor of proportionality differs depending on the types of the oscillator 30, specifically, the constituent materials of the oscillator 30 such as crystal, Si, and ceramic. The factor of proportionality can be estimated based on a coefficient calculated by "piezoelectric efficiency÷Young's modulus of constituent material×element structure factor".

Here, the crystal oscillator and the Si oscillator each having the oscillation frequency f of 32 kHz are described as examples. A piezoelectric substance of the crystal oscillator is crystal. Meanwhile, in the Si oscillator lithium niobate, aluminum nitride, or the like is used as a piezoelectric substance. A piezoelectric coefficient d33 of crystal is approximately 2.0 μm/V, and a piezoelectric invariable d33 of the piezoelectric substance of the Si oscillator is approximately 5.5 μm/V. The piezoelectric invariable d33 is an invariable indicating a ratio of distortion generated when an electric filed per unit strength. Thus, based on Ohm's law, such value and the equivalent series resistance value of each of the oscillators are converted into an invariable indicating a ratio of distortion generated when a current value per unit is applied. As a result, 60 nm/A is obtained for crystal, and 440 nm/A is obtained for the piezoelectric substance of the Si oscillator. In other words, it can be understood that the piezoelectric coefficient of the piezoelectric substance of the Si oscillator is approximately 7.3 times as great as that of crystal.

When the resultant value is multiplied by "Iq/f" described above, displacement amount conversion efficiency of each of the piezoelectric substances, that is, piezoelectric efficiency described above is obtained. The values of Iq/f obtained by applying the same voltage to the crystal oscillator and the Si oscillator each having the oscillation frequency f of 32 kHz are compared with each other. Based on the ratio of the equivalent series resistance values, the value of the Si oscillator is 0.375 times as great as that of the crystal oscillator. When the calculation results of piezoelectric efficiency are compared to each other, it can be understood that the piezoelectric substance of the Si oscillator has piezoelectric efficiency that is approximately 2.75 times as high as that of crystal.

Meanwhile, comparison is made based on Young's modulus, the value of crystal is approximately 76 GPa, and the value of Si is approximately 185 GPa. Therefore, it can be said that, in Si, a stress generated in the piezoelectric substance is less likely to be converted into displacement, as compared to crystal.

The coefficients obtained by "piezoelectric efficiency÷Young's modulus of constituent material" are calculated based on the calculation results described above. As a result, the coefficient of the Si oscillator is substantially 1.1 times as great as the coefficient of the crystal oscillator.

Further, the element structure factor is a parameter that converts expansion of the piezoelectric substance into displacement of the element and is derived from a structure. For example, in the oscillator in the kHz band, a cantilever structure is known as a structure in which displacement of the element is easily obtained. In the cantilever structure, bending oscillation is main oscillation, and displacement at the distal end of the arm of the element is proportional to an arm length. Therefore, the element structure factor in this case is the arm length. In the crystal oscillator, the arm length can be set to 1 mm or greater, for example, 1.2 mm. Meanwhile, the equivalent series resistance value of the Si oscillator is greater than that of the crystal oscillator, and an arm length thereof is shorter than that of the crystal oscillator, for example, 0.55 mm. In other words, the arm length of the Si oscillator is 0.45 times as great as that of the crystal oscillator. The coefficient obtained by "piezoelectric efficiency÷Young's modulus of constituent material×element structure factor (arm length of element)" described above is calculated. AS a result, the coefficient of the Si oscillator is approximately 0.5 times of the coefficient of the crystal oscillator.

The coefficient corresponds to a ratio of the displacement amount when an equivalent current value is applied. Therefore, in order to obtain the same displacement value as that of the crystal oscillator, the Si oscillator requires a current value approximately twice as great as that of the crystal oscillator.

As apparent from the description given above, it can be theoretically described that, when the amplitude value Iq of the current is derived, Iq can be calculated by performing correction in consideration of the type of the oscillator 30 within the above-mentioned range of Iq/f and the calculation value can be set.

Further description is given below while considering actual measurement values and the like. Here, the oscillator 30 is the crystal oscillator.

2.6. Oscillation Condition of Crystal Oscillator

Next, the oscillation condition of the oscillator 30 being a crystal oscillator is described in more detail.

2.6.1. Relationship between Amplitude Value Iq of Current and Drive Level

First, description is made on a relationship between the amplitude value Iq of the current and the drive level.

In general, in the crystal oscillator, a non-linear phenomenon such as increase of the equivalent series resistance value is caused when the drive level exceeds a predetermined threshold value. The non-linear phenomenon of this type reduces the current value applied to the crystal oscillator, which also reduces the B value. For example, when the crystal oscillator has the oscillation frequency f of 1 MHz and the equivalent series resistance value of 1Ω being the minimum level, it is estimated that the maximum current value that can be applied is approximately 100 mA. Further, when the crystal oscillator has the oscillation frequency f of 5 MHz and the equivalent series resistance value of 5Ω, it is estimated that the maximum current value that can be applied is approximately 500 mA. Therefore, in the crystal oscillator, the upper limit value of Iq/f is $1\times10^{-7}$.

Figure 15:
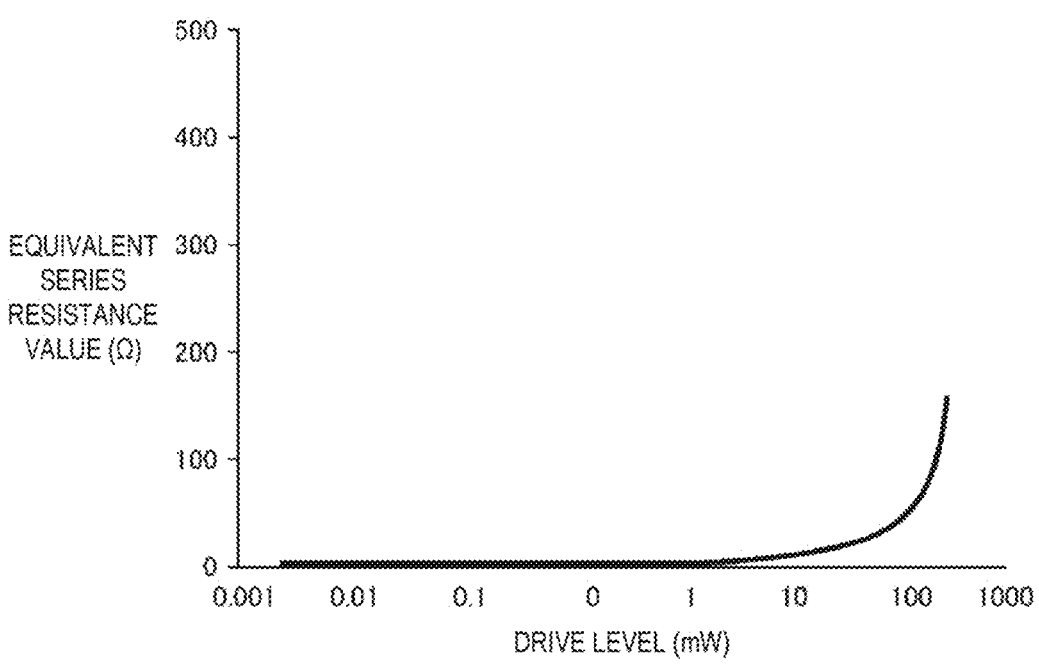
FIG. 15 is a graph showing a relationship between a drive level and an equivalent series resistance of a crystal oscillator having an oscillation frequency f of 5 MHz.
Figure 16:
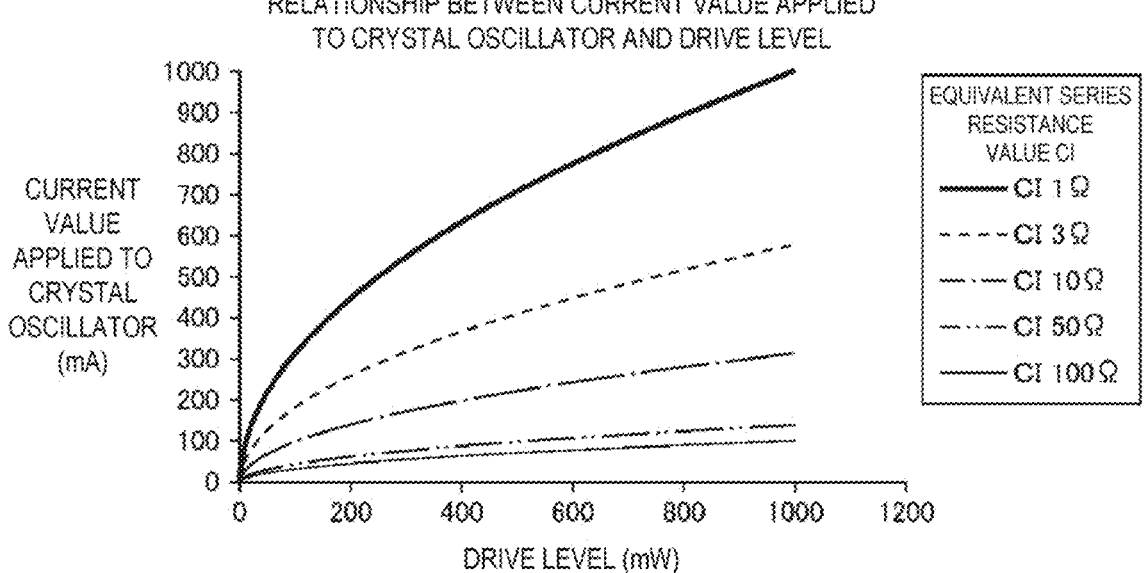
FIG. 16 is a graph showing a relationship between a drive level and a current value applied to the crystal oscillator, which is obtained from the relationship shown in FIG. 15.

FIG. 15 is a graph showing a relationship between the drive level and the n equivalent series resistance of the crystal oscillator having the oscillation frequency f of 5 MHz. FIG. 16 is a graph showing a relationship between the drive level and the current value applied to the crystal oscillator, which is obtained from the relationship shown in FIG. 15.

As shown in FIG. 15, the equivalent series resistance value of the crystal oscillator is rapidly increased when the drive level of the crystal oscillator exceeds a predetermined threshold value. The non-linear phenomenon of this type reduces the current value applied to the crystal oscillator. When the crystal oscillator has the oscillation frequency f of 5 MHz and the equivalent series resistance value of 5Ω, it is estimated that the threshold value is present at a point where the drive level is around 100 mW.

FIG. 16 shows a relationship between the drive level and the current value applied to the crystal oscillator when an equivalent series resistance value CI is 1 Ω, 3 Ω, 10 Ω, 50Ω, and 100Ω.

For example, when the crystal oscillator having the equivalent series resistance value CI of 1Ω is operated at the drive level of 100 mW, it is estimated that a current of approximately 300 mA at most is applied. In a case of an actual element, the current may be approximately 100 mA. When this value is used, the upper limit value of Iq/f is $1\times10^{-7}$ in the crystal oscillator.

For this reason, the upper limit value of Iq/f is basically $1\times10^{-7}$, preferably $3\times10^{-8}$.

2.6.2. Relationship between Amplitude Value Iq of Current and B Value

Next, the relationship between the amplitude value Iq of the current and the B value is described.

When Iq/f is equal to or greater than the lower limit value described above, minimum necessary accuracy of demodulation can be obtained in the laser interferometer 1 without depending on the oscillation condition of the crystal oscillator as described above. In other words, the lower limit value of the lower Iq/f is obtained based on the B value that can be demodulated when the ADCs 532 and 533 illustrated in FIG. 1 have sufficiently high performance (large sampling bit number). Specifically, it can be said that the largest and realistic sampling bit number of the ADCs 532 and 533 is 14 bits. In this case, the lowest B value that can be demodulated by the demodulation circuit 52 using the ADCs 532 and 533 with the sampling bit number of 14 bits is obtained. With this, the lower limit value of Iq/f is obtained.

Figure 17:
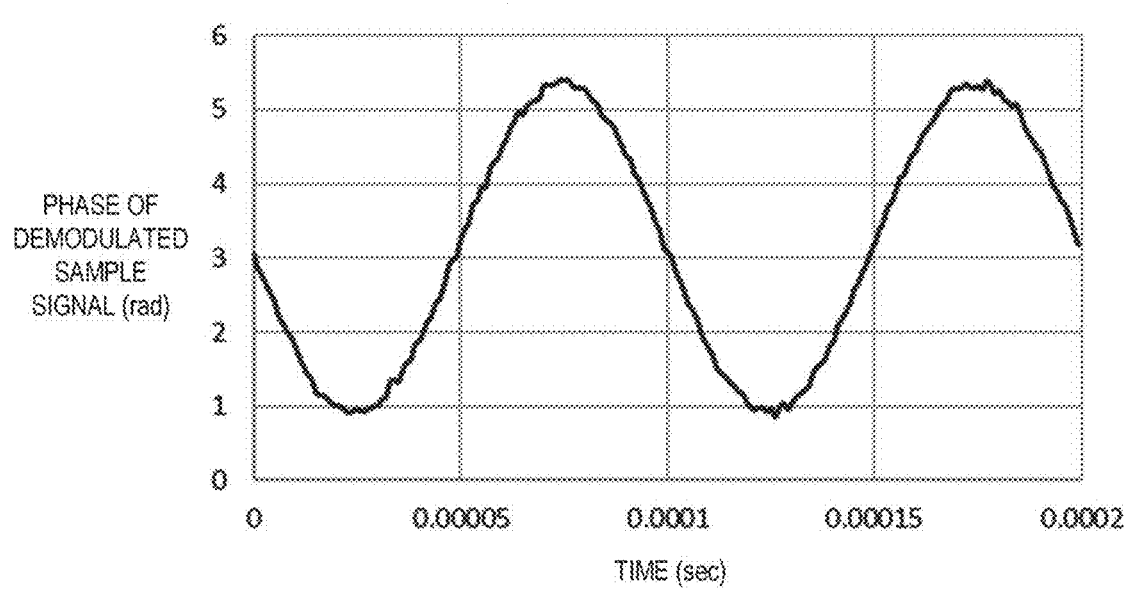
FIG. 17 is a graph showing a phase change of a sample signal demodulated in a demodulation circuit when a piezoelectric actuator that oscillates at a displacement amplitude of 150 nm and an oscillation frequency of 10 kHz is an object to be measured.
Figure 17:
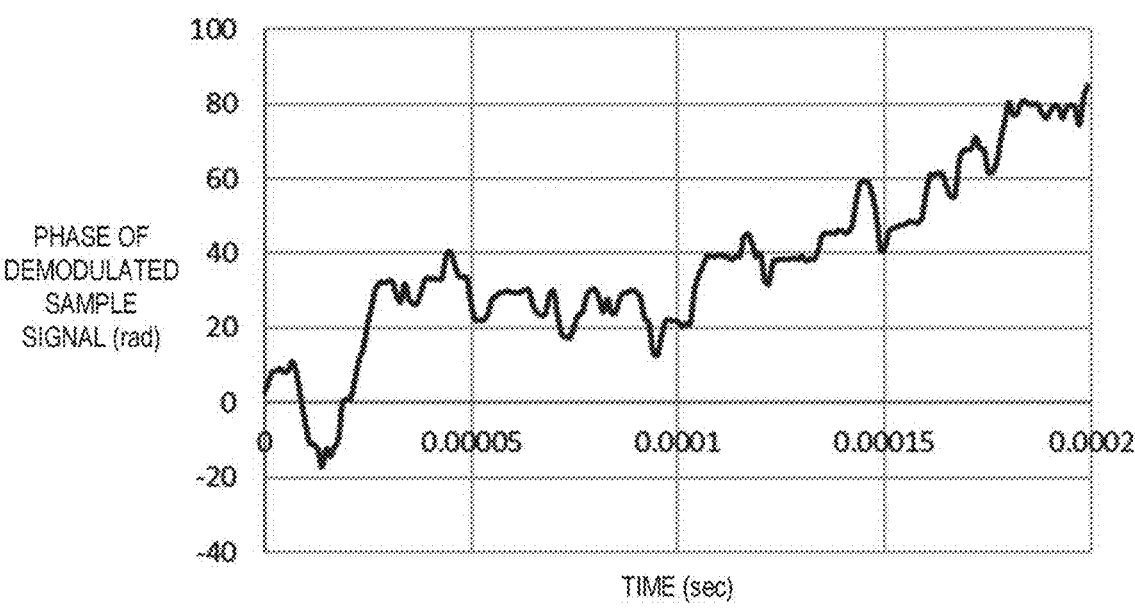

FIG. 17 is a graph showing a phase change of the sample signal demodulated in a demodulation circuit 52 when a piezoelectric actuator that oscillates at a displacement amplitude of 150 nm and an oscillation frequency of 10 kHz is an object to be measured. In FIG. 17, comparison is made regarding to change of demodulation accuracy when the B value is 0.05 and a signal-to-noise ratio (SN ratio) of the voltage of the photoreception signal differs between 80 dB and 60 dB.

When the SN ratio of the photoreception signal is set to 80 dB, sampling is performed by the ADCs 532 and 533 having high accuracy in terms of the sampling bit number of 14 bits. With this, as shown in FIG. 17, a phase change having a sinusoidal wave shape can be demodulated at minimum accuracy.

In contrast, in a case in which the SN ratio of the photoreception signal is set to 60 dB, even when sampling is performed by the ADCs 532 and 533 having high accuracy in terms of the sampling bit number of 14 bits, only an irregular waveform appears as a result of demodulation as shown in FIG. 17, and hence a phase change having a sinusoidal wave shape cannot be demodulated.

Based on the results thus obtained, it is confirmed that, when the B value is 0.05 or greater, the demodulation circuit 52 is capable of executing the demodulation processing at minimum necessary accuracy by performing sampling by the ADCs 532 and 533 having the sampling bit number of 14 bits.

Thus, the lower limit value of the B value for achieving minimum necessary demodulation accuracy is obtained as 0.05.

Figure 18:
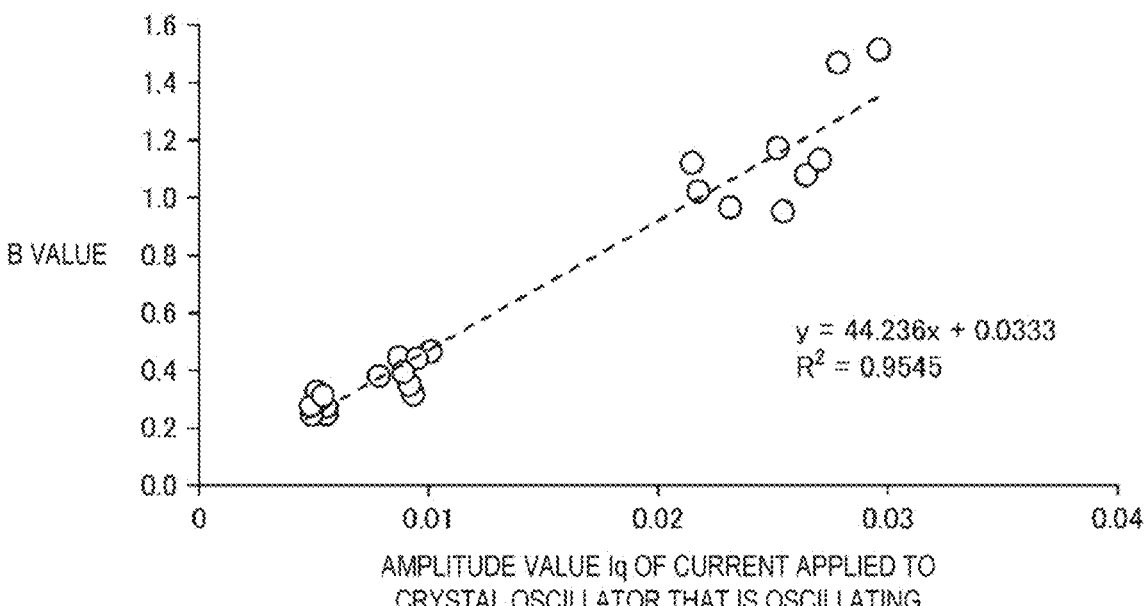
FIG. 18 is a graph showing a relationship between a B value and an amplitude value Iq of a current applied to the crystal oscillator that is oscillating.

FIG. 18 is a graph showing a relationship between the B value and the amplitude value Iq of the current applied to the crystal oscillator that is oscillating.

As shown in FIG. 18, the B value and the amplitude value Iq of the current are co-related, which is expressed by a regression line. The mathematical equation shown in FIG. 18 is one example of an expression established between y and x, wherein the B value is y and the amplitude value Iq of the current is x. Further, $R^2$ is one example of a determination coefficient obtained in a regression analysis of experiment values. In the example shown in FIG. 18, the B value and the amplitude value Iq of the current match with a regression line model with a relatively high determination coefficient.

Based on the mathematical equation shown in FIG. 18, the amplitude value Iq of the current when the B value is 0.05 is calculated, and thus approximately 0.4 mA is obtained. In consideration of the fact that the oscillation frequency f of the crystal oscillator may be selected variously, the lower limit value of the amplitude value Iq of the current can be set to 1 mA. When the oscillation frequency f of the crystal oscillator shown in FIG. 18 is 5 MHz, the lower limit value of Iq/f is $2 \times 10^{-10}$.

Figure 19:
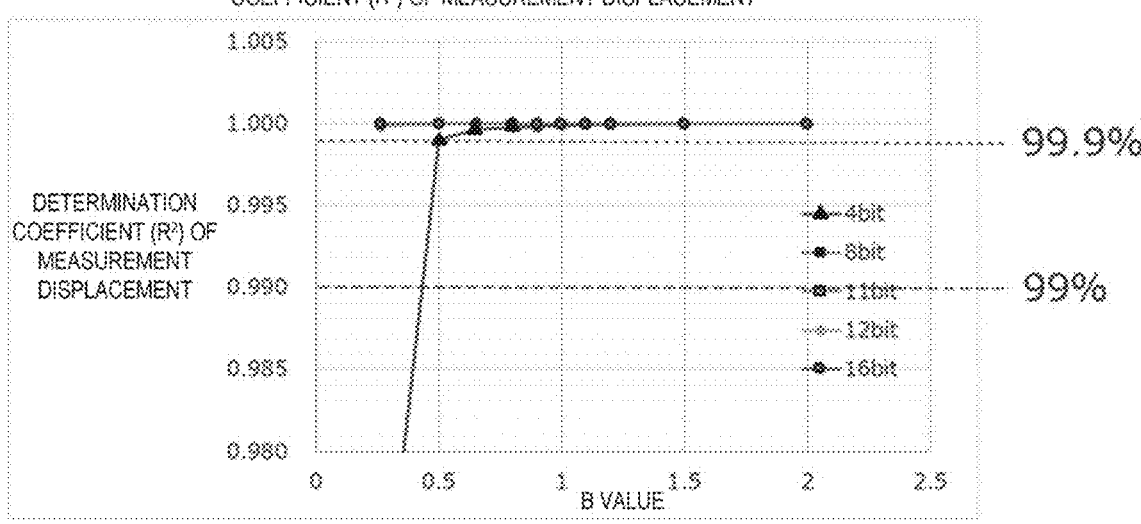
FIG. 19 is a graph showing a relationship between the B value, and a determination coefficient ($R^2$ value) and standard deviation of measurement displacement, when a sample signal derived from the object to be measured is demodulated at the demodulation circuit and displacement is measured.
Figure 19:
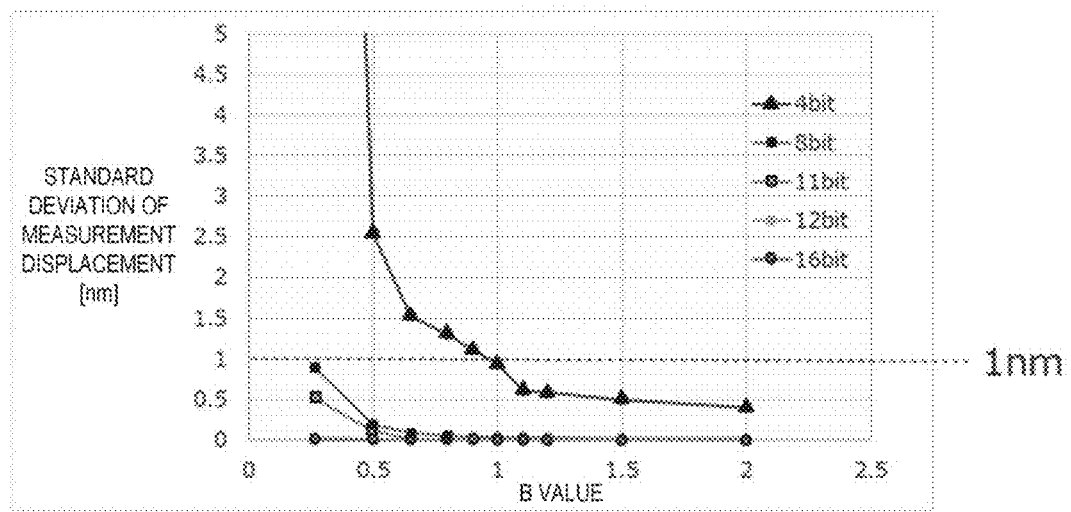

FIG. 19 is a graph showing a relationship between the B value, and the determination coefficient ($R^2$) and standard deviation of measurement displacement, when the sample signal derived from the object 14 to be measured is demodulated at the demodulation circuit 52 and displacement is measured. Note that, in FIG. 19, the sampling bit number of the ADC 532 is changed at five steps of 4, 8, 11, 12, and 16 bits, and measurement results are shown.

As one example, a sample that oscillates at an oscillation frequency of 10 kHz is used as the object 14 to be measured. The B value of the oscillator is swung from 0.265 to 2.000. Further, laser light that is emitted from a VCSEL and has a wavelength of 850 nm is used as the laser light.

As shown in FIG. 19, even when the ADC 532 has the sampling bit number of 8 bits, which is general as a performance level, target accuracy can be achieved regardless of the B value. Note that the target accuracy is as follows.

The B value exceeds 0.5, and the determination coefficient $R^2$ is 99.9% or greater regardless of the bit number.

When the sampling bit number is 8 bits or greater, the standard deviation is 1 nm or less regardless of the B value.

When the sampling bit number is 4 bits, the standard deviation is 1 nm or less with the B value exceeding 1.0.

Note that, focusing on a shift of the standard deviation when the sampling bit number is 8 bits, it can be confirmed that the target accuracy is achieved with sufficient margin when B≥0.5. Therefore, in a case of 8 bits, robustness at the time of measurement can be sufficiently improved when B≥0.5. Further, in view of demodulation accuracy, it is also confirmed that the B value is more advantageous as the B value is greater. Based on the above-mentioned mathematical equation shown in FIG. 18, the amplitude value Iq of the current applied to the crystal oscillator when B≥0.5 is calculated, and thus 10.5 mA or greater is obtained. In this case, when the oscillation frequency f of the crystal oscillator is from 5 MHz to 6 MHz, the lower limit value of Iq/f is $2 \times 10^{-9}$.

Note that, in the upper graph of FIG. 19, the markers overlap with one another near the point at which the determination coefficient is 1.000, and cannot be distinguished from one another, except for the marker indicating the data of 4 bits. Further, in the lower graph of FIG. 19, the data of 12 bits and the data of 16 bits overlap with each other near the point at which the standard deviation is 0, and cannot be distinguished from each other.

Figure 20:
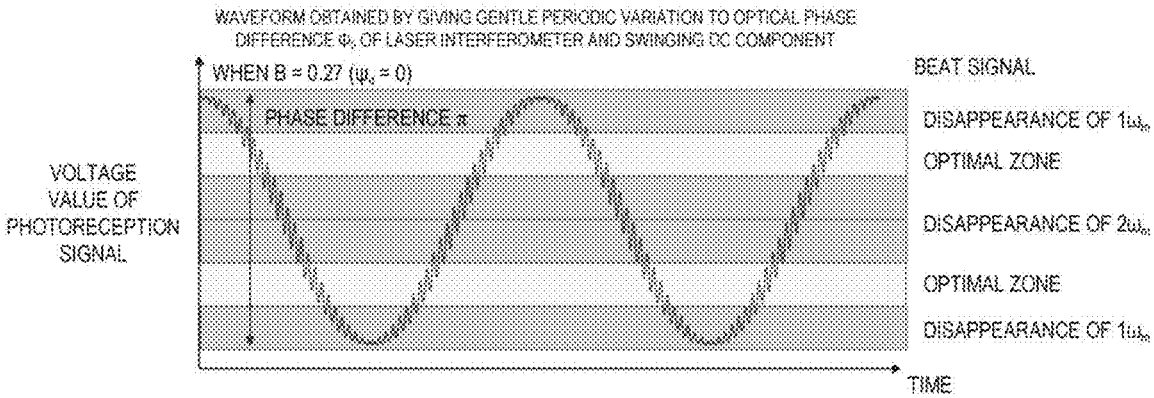
FIG. 20 is one example of a waveform of a photoreception signal obtained as a result of simulation under a predetermined initial condition.

FIG. 20 is one example of a waveform of the photoreception signal obtained as a result of simulation under a predetermined initial condition. As described above, the photoreception signal that is output from the photoreceptor 10 can be divided into a DC component and an AC component. In FIG. 20, in order to recreate various states that the initial optical path phase difference $\varphi_0$ in the laser interferometer 1 may be in, a gentle periodic variation is given to $\varphi_0$. Therefore, in FIG. 20, a DC component $\cos(\varphi_0)$ corresponds to a period of a long wave, and an AC component $\cos(\psi_m - \psi_d + \varphi_0)$ corresponds to a period of a short wave. $\psi_m$ is a phase of the modulation signal derived from the optical modulator 12, and is expressed in $\psi_m = B \sin(\omega_m t)$. $\psi_d$ is a phase of the sample signal derived from the object 14 to be measured. Note that, in FIG. 20, the phase $\psi_d = 0$. Further, as one example, B=0.27.

The period of the long wave and the period of the short wave are changed variously according to a measurement condition. In view of this, in order to perform stable measurement while coping with any movements of the object 14 to be measured, it is required that a line indicating the waveform of the photoreception signal fall within two regions denoted with "optimal zone" in FIG. 20. The optimal zone is a region in which both a signal component of an angular frequency $1 \cdot \omega_m$ being a basic wave and a signal component of an angular frequency $2 \cdot \omega_m$ being a higher harmonic appear as the AC components of the photoreception signal. In other words, as shown in FIG. 20, when the line is out of the optimal zone, the signal component of $1 \cdot \omega_m$ disappears, or the signal component of $2 \cdot \omega_m$ disappears. The signal component of $1 \cdot \omega_m$ is a component corresponding to the central angular frequency $\omega_m$ of the first band pass filter 534 in Expression (10) given above. Further, the signal component of $2 \cdot \omega_m$ is a component corresponding to the central angular frequency $2\omega_m$ of the second band pass filter 535 in Expression (10) given above.

It is only required an amplitude of $\psi_m + \varphi_0$ in the AC component be greater than $\pi/3$. With this, the line indicating the waveform of the received signal falls within the "optimal zone". Further, the amplitude is preferably greater than $\pi/2$.

Based on this, it is only required that, at least, $\Delta\psi_m + \Delta\psi_d > \pi/3$, wherein an amplitude change of the phase $\psi_m$ of the modulation signal is $\Delta\psi_m$ and an amplitude change of the phase $\psi_d$ of the sample signal is $\Delta\psi_d$. Further, $\Delta\psi_m$ is preferably as great as possible as approaching $\pi/3$. With this, stable measurement is achieved.

Note that, based on the expression of $\psi_m = B \sin(\omega_m t)$ given above, the amplitude change $\Delta\psi_m$ of the phase $\psi_m$ of the modulation signal corresponds to the B value. Therefore, the B value is preferably $\pi/3$ or greater. With this, even when displacement of the object 14 to be measured is more minute, stable measurement can be achieved. Based on the above-mentioned mathematical equation shown in FIG. 18, the amplitude value Iq of the current applied to the crystal oscillator when $B \geq \pi/3$ is calculated, and thus 22.9 mA or greater is obtained. In this case, the oscillation frequency f of the crystal oscillator is from 5 MHz to 6 MHz, the lower limit value of Iq/f is $4 \times 10^{-9}$.

For this reason, the lower limit value of Iq/f is preferably $2 \times 10^{-10}$, more preferably $2 \times 10^{-9}$, further more preferably $4 \times 10^{-9}$.

Therefore, when the oscillator 30 is the crystal oscillator, preferably $2 \times 10^{-10} \leq \mathrm{Iq}/\mathrm{f} \leq 1 \times 10^{-7}$, more preferably $2 \times 10^{-9} \leq \mathrm{Iq}/\mathrm{f} \leq 3 \times 10^{-8}$, further more preferably $4 \times 10^{-9} \leq \mathrm{Iq}/\mathrm{f} \leq 3 \times 10^{-8}$, wherein the amplitude value of the current applied to the crystal oscillator is Iq [A] and the oscillation frequency of the crystal oscillator is f [Hz].

When Iq/f falls within the above-mentioned range, the sample signal derived from the object 14 to be measured can be demodulated at higher accuracy without depending on the oscillation condition of the crystal oscillator. Further, the sample signal can be stably demodulated while coping with any movements of the object 14 to be measured.

The oscillation condition of the crystal oscillator is described above, and the crystal oscillator may be an AT oscillator, a tuning-fork type oscillator, or any other oscillator.

In Table 1 given below, comparison is made between the crystal oscillator having the oscillation frequency f in the MHz band and the crystal oscillator having the oscillation frequency f in the kHz band, regarding the above-mentioned calculation results of Iq/f. Note that each numerical value shown in Table 1 is a merely example.

TABLE 1

| | Unit | Crystal oscillator in MHz band | Crystal oscillator in kHz band |
| --- | --- | --- | --- |
| Oscillation frequency f | Hz | $5.00 \times 10^6$ | $3.2 \times 10^4$ |
| Parallel capacitance $C_0$ | pF | 2.8 | 0.9 |

TABLE 1-continued

| | Unit | Crystal oscillator in MHz band | Crystal oscillator in kHz band |
| --- | --- | --- | --- |
| Series inductance $L_1$ | H | 0.18 | $1.03 \times 10^4$ |
| Series capacitance $C_1$ | fF | 5.5 | 2.1 |
| Equivalent series resistor $R_1$ | $\Omega$ | 30 | $2.00 \times 10^4$ |
| Q value | — | 192,915 | 118,419 |
| Load capacitance $C_L$ calculated by simulation with oscillation at applied voltage of 10 V | pF | 100 | 100 |
| Amplitude value Iq of current applied to crystal oscillator when B value is maximum in simulation with oscillation at applied voltage of 10 V | A | 0.03911 | 0.00022 |
| Iq/f | — | $7.73 \times 10^{-9}$ | $6.43 \times 10^{-9}$ |

As shown in Table 1 given above, the values of Iq/f are calculated for the crystal oscillator having the oscillation frequency f in the MHz band and the crystal oscillator having the oscillation frequency f in the kHz band. As a result, the values of Iq/f of both the crystal oscillators are substantially equal to each other. A representative example of the crystal oscillator in the MHz band is an AT oscillator, and a representative example of the crystal oscillator in the kHz band is a tuning-fork type oscillator. Thus, according to the description, it is only required that the crystal oscillator be set to have Iq/f falling within the above-mentioned range, without depending on an oscillation mode of the oscillator.

2.7. Oscillation Condition of Si Oscillator

The oscillation circuit 54 enables oscillation of a Si oscillator and a ceramic oscillator, as well as a crystal oscillator. Here, the oscillation condition of the oscillator 30 being a Si oscillator is described in more detail. Note that, in the following description, only the differences from the crystal oscillator are described, and description for similar matters is omitted.

2.7.1. Relationship between Amplitude Value Iq of Current and Drive level

First, description is made on a relationship between the amplitude value Iq of the current and the drive level. In the Si oscillator a non-linear phenomenon such as increase of the equivalent series resistance value is also caused when the drive level exceeds a predetermined threshold value. Therefore, basically, in the Si oscillator the upper limit value of Iq/f is also $1 \times 10^{-7}$. Si is reduced in size more easily than crystal, and has a tendency that a non-linearity appears and an applied current amount is reduced. Thus, the upper limit value is preferably $5 \times 10^{-8}$.

2.7.2. Relationship Between Amplitude Value Iq of Current and B Value

Next, the relationship between the amplitude value Iq of the current and the B value is described.

The Si oscillator and the ceramic oscillator, the crystal oscillator have equivalent series resistance value greater than that of the crystal oscillator, and hence have a tendency that a current is hardly applies. Thus, the lower limit value of Iq/f is preferably $4 \times 10^{-10}$, more preferably $4 \times 10^{-9}$, further more preferably $8 \times 10^{-9}$.

Therefore, when the oscillator 30 is the Si oscillator, preferably $4 \times 10^{-10} \leq \mathrm{Iq}/\mathrm{f} \leq 5 \times 10^{-8}$, more preferably $4 \times 10^{-9} \leq \mathrm{Iq}/\mathrm{f} \leq 5 \times 10^{-8}$, further more preferably $8 \times 10^{-9} \leq \mathrm{Iq}/\mathrm{f} \leq 5 \times 10^{-8}$, wherein the amplitude value of the current applied to the Si oscillator is Iq [A] and the oscillation frequency of the Si oscillator is f [Hz].

When Iq/f falls within the above-mentioned range, the sample signal derived from the object 14 to be measured can be demodulated at higher accuracy without depending on the oscillation condition of the Si oscillator. Further, the sample signal can be stably demodulated while coping with any movements of the object 14 to be measured.

2.8. Relationship Between Setting of Oscillation Circuit and B Value

As described above, the laser interferometer 1 according to the exemplary embodiment includes the oscillation circuit 54. The oscillation circuit 54 may be replaced with the above-mentioned signal generator. However, the oscillation circuit 54 is preferably a circuit that selectively amplifies a signal having a specific resonance frequency by returning an output from the oscillator 30 to an input as in the above-mentioned single step inverter oscillation circuit. The circuit of this type utilizes an output from the oscillator 30 to maintain oscillation of the oscillator 30 in a highly stable manner. In other words, the oscillator 30 functions as a signal source of the oscillation circuit 54. Therefore, with the oscillation circuit 54 as described above, simplification and size reduction of the circuit configuration can be easily achieved.

Further, the oscillation circuit 54 outputs the reference signal Ss having high accuracy, and this signal is input to the demodulation circuit 52. The reference signal Ss that is output from the oscillation circuit 54 is input to the demodulation circuit 52. With this, there is no need to additionally prepare for a signal generator or the like for generating the reference signal Ss. Thus, in view of this, the oscillation circuit 54 also contributes to reduction in size and weight of the laser interferometer 1.

Further, in a case in which the oscillation circuit 54 is used, even when the natural frequency $f_Q$ of the oscillator 30 varies for various reasons as described above, the oscillation frequency $f_{osc}$ can be changed along with the natural frequency $f_Q$. With this, significant increase of $\Delta f$ ($=f_{osc}-f_Q$) described above can be prevented. Along with this, reduction of the B value associated with $\Delta f$ can be prevented. As a result, when the oscillation circuit 54 described above is used, the B value that is greater can be secured.

However, as obtained in Expression (b) given above, the oscillation frequency $f_{osc}$ of the oscillation circuit 54 does not match with the natural frequency $f_Q$ of the oscillator 30, and hence $\Delta f$ always becomes a value exceeding 0. Thus, in order to further increase the B value, it is required to optimize $\Delta f$ within a predetermined range.

2.8.1. Relationship between Load Capacitance $C_L$ and B Value

The load capacitance $C_L$ of the oscillation circuit 54 is obtained in Expression (a) given above. $\Delta f$ is inversely proportional to the load capacitance $C_L$ as in Expression (d) given above.

Figure 21:
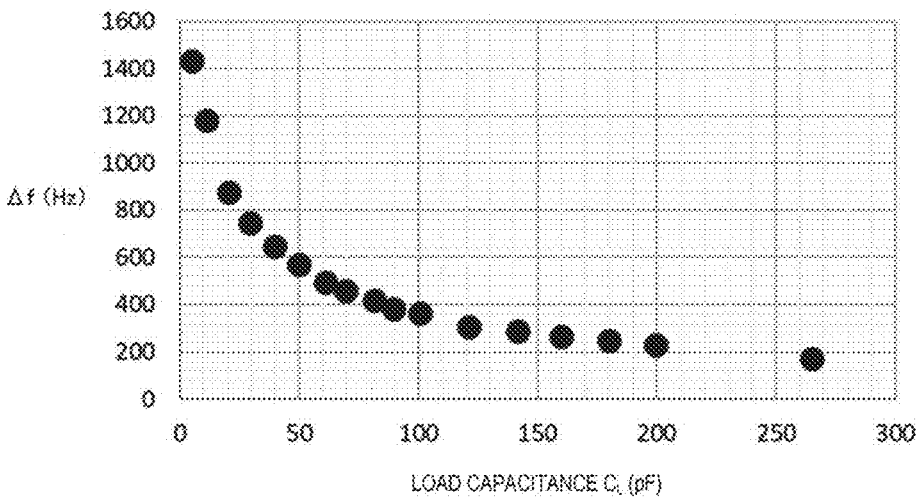
FIG. 21 is a graph showing a relationship between a load capacitance $C_L$ of the oscillation circuit and $\Delta f$.

FIG. 21 is a graph showing a relationship between the load capacitance $C_L$ of the oscillation circuit 54 and $\Delta f$. The graph shown in FIG. 21 and Expression (d) given above match with each other. Therefore, $\Delta f$ can be adjusted by changing the load capacitance $C_L$ as appropriate.

Figure 22:
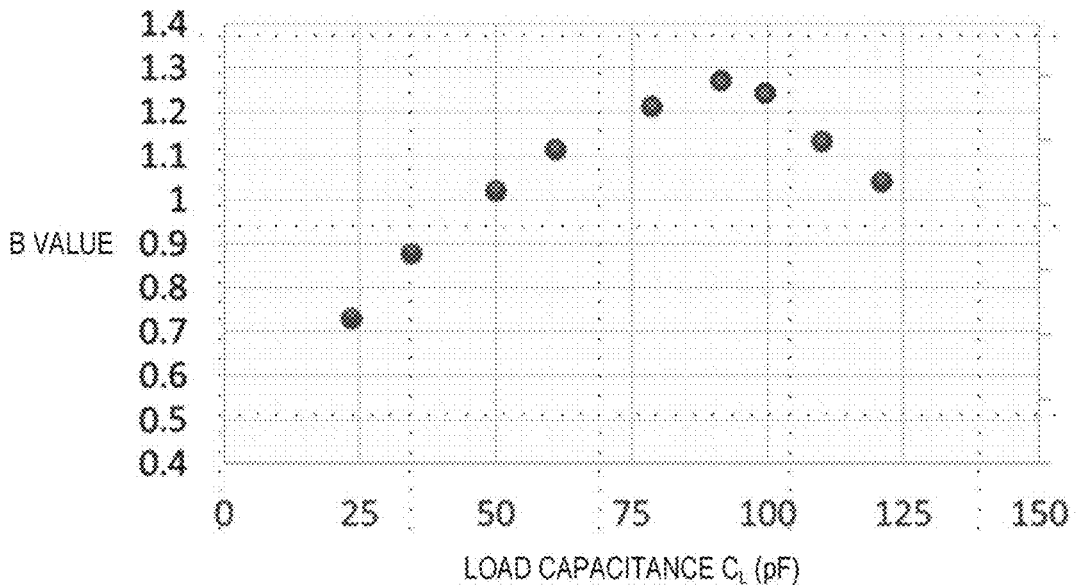
FIG. 22 is a graph showing a relationship between the load capacitance $C_L$ and the B value when an applied voltage Vq to the oscillator is 10 V and is 5 V, respectively.
Figure 22:
Figure 22:
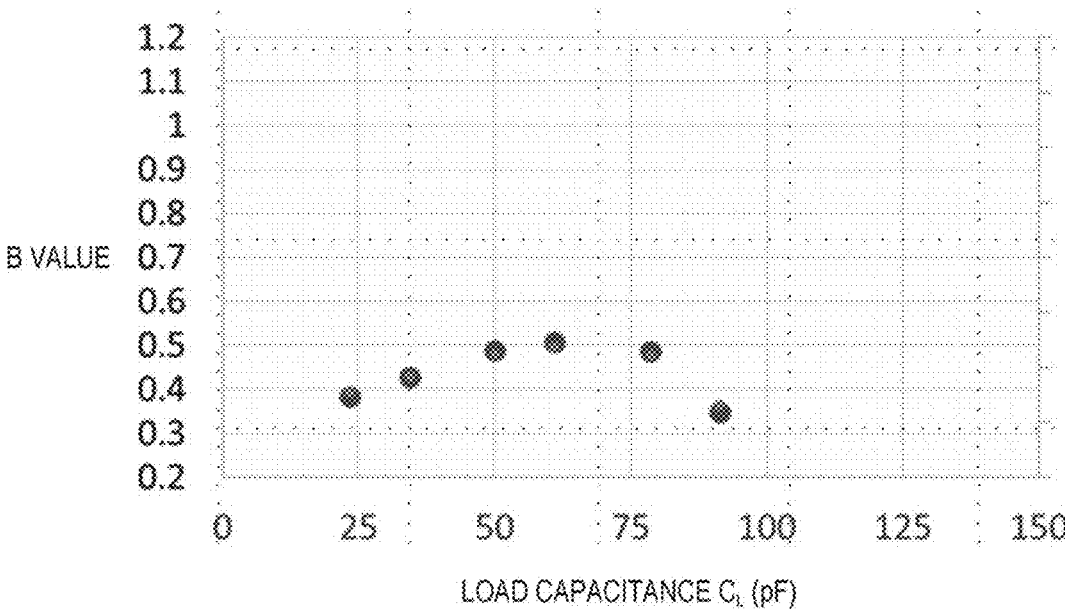

FIG. 22 is a graph showing a relationship between the load capacitance $C_L$ and the B value when an applied voltage Vq to the oscillator 30 is 10 V and is 5 V, respectively.

In any one of the cases in which the applied voltage Vq is 10 V and 5 V, change of the B value with respect to the load capacitance $C_L$ has a maximum value. Further, from the graph in FIG. 22, it is confirmed that the B value has a maximum value when the load capacitance $C_L$ falls within a range from 50 pF to 150 pF.

Figure 23:
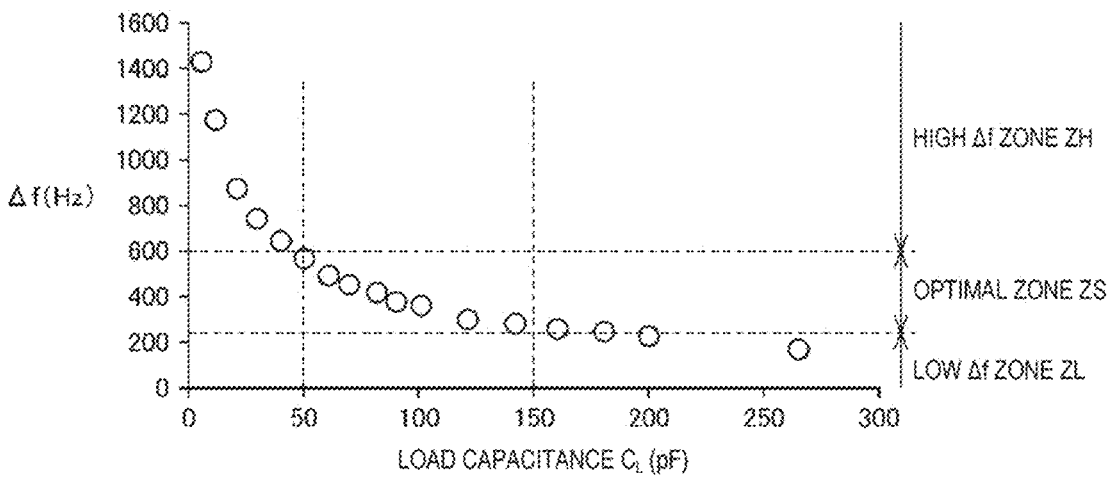
FIG. 23 is a diagram obtained by overlapping an optimal range of the load capacitance $C_L$ obtained from FIG. 22 with the graph in FIG. 21.

FIG. 23 is a diagram obtained by overlapping an optimal range of the load capacitance $C_L$ obtained from FIG. 22 with the graph in FIG. 21.

An "optimal zone ZS" in FIG. 23 is a region in which the load capacitance $C_L$ is from 50 pF to 150 pF, which is derived from FIG. 22. From FIG. 23, it is confirmed that, when $\Delta f$ is from 240 [Hz] to 600 [Hz], the B value that is great is obtained.

Note that, in FIG. 23, a zone in which $\Delta f$ is greater than that in the optimal zone ZS is referred to as a "high $\Delta f$ zone ZH", and a zone in which $\Delta f$ is less than that in the optimal zone ZS is referred to as a "low $\Delta f$ zone ZL".

In the high $\Delta f$ zone ZH, $\Delta f$ exceeds 600 Hz. In this frequency band, an impedance is increased. Thus, displacement of the oscillator 30 is hardly obtained.

In the low $\Delta f$ zone ZL, $\Delta f$ is less than 240 Hz, and the load capacitance $C_L$ exceeds 150 pF. Here, the limit resistor Rd and the second capacitor Cd of the oscillation circuit 54 illustrated in FIG. 11 are equivalent to a primary CR low pass filter. For example, it is required that the capacitance of the second capacitor Cd be from 160 pF to 250 pF so that the load capacitance $C_L$ is 100 pF. In this case, a cut-off frequency of the primary CR low pass filter is approximately 10 MHz. In general, in the primary CR low pass filter, attenuation is started from a frequency of approximately one-tenth or one-fifth of the cut-off frequency. Thus, for example, when the oscillator 30 oscillates at an oscillation frequency of 5 MHz, the primary CR low pass filter has an influence on an oscillation operation. In other words, the primary CR low pass filter transmits the voltage signal of the oscillation circuit 54, and thus the voltage signal of the oscillation circuit 54 attenuates. Thus, in the low $\Delta f$ zone ZL, displacement of the oscillator 30 is hardly obtained.

2.8.2. Relationship between Resistance Value of Limit Resistor Rd and B Value

It is considered that the resistance value of the limit resistor Rd of the oscillation circuit 54 has a large influence on securing the amplitude value Iq of the current applied to the oscillator 30. Two main reasons for this are given. For the first reason, the limit resistor Rd limits a value of the current applied to the oscillation circuit 54. Thus, it is considered that the amplitude value Iq of the current is greater as the resistance value is less. For the other reason, it is considered that the cut-off frequency of the primary CR low pass filter described above depends on the resistance value of the limit resistor Rd.

Figure 24:
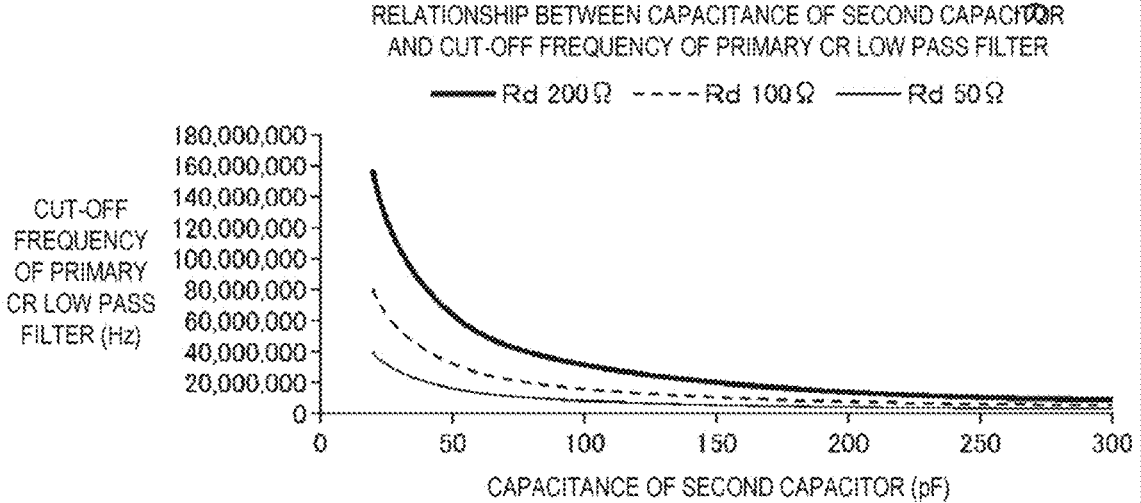
FIG. 24 is a graph showing a relationship of a capacitance of a second capacitor Cd and a cut-off frequency fc of a primary CR low pass filter when a resistance value of a limit resistor Rd of the oscillation circuit is swung to three levels including 50 Ω, 100Ω, and 200Ω.

FIG. 24 is a graph showing a relationship of the capacitance of the second capacitor Cd and a cut-off frequency fc of the primary CR low pass filter when the resistance value of the limit resistor Rd of the oscillation circuit 54 is swung to three levels including 50 $\Omega$, 100$\Omega$, and 200$\Omega$.

As shown in FIG. 24, the cut-off frequency fc is higher as the resistance value of the limit resistor Rd is less. Thus, in view of the cut-off frequency fc, it is more advantageous for increasing the amplitude value Iq of the current as the resistance value of the limit resistor Rd is smaller.

Figure 25:
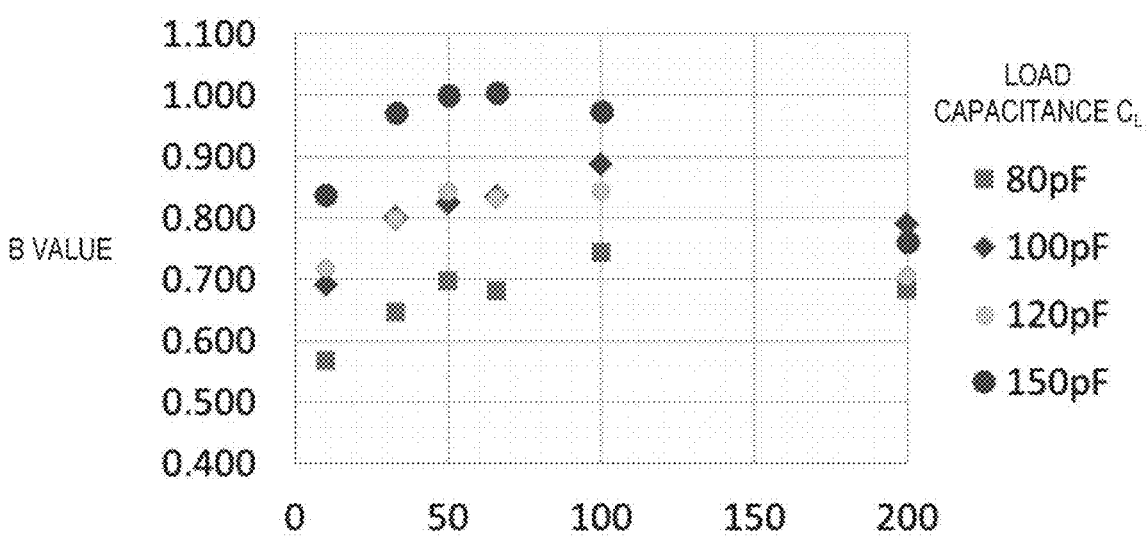
FIG. 25 is a graph showing a relationship of the resistance value of the limit resistor Rd of the oscillation circuit and the B value when the load capacitance $C_L$ of the oscillation circuit is swung to four levels including 80 pF, 100 pF, 120 pF, and 150 pF.
Figure 26:
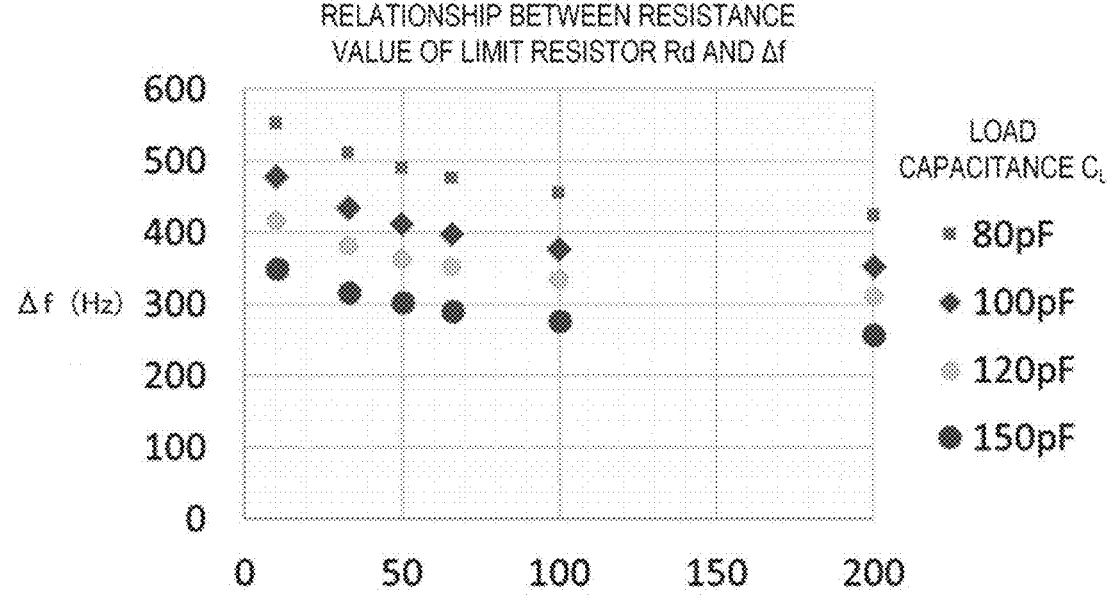
FIG. 26 is a graph showing a relationship between the resistance value of the limit resistor Rd of the oscillation circuit and $\Delta f$ when the load capacitance $C_L$ of the oscillation circuit is swung to the four levels including 80 pF, 100 pF, 120 pF, and 150 pF.

FIG. 25 is a graph showing a relationship of the resistance value of the limit resistor Rd of the oscillation circuit 54 and the B value when the load capacitance $C_L$ of the oscillation circuit 54 is swung to four levels including 80 pF, 100 pF, 120 pF, and 150 pF. FIG. 26 is a graph showing a relationship between the resistance value of the limit resistor Rd of the oscillation circuit 54 and $\Delta f$ when the load capacitance $C_L$ of the oscillation circuit 54 is swung to the four levels including 80 pF, 100 pF, 120 pF, and 150 pF.

In FIG. 25, regardless of the load capacitance $C_L$, the resistance value of the limit resistor Rd is less than 50$\Omega$, the B value is reduced. The reason for the reduced B value is because Δf is increased when the resistance value of the limit resistor Rd is less than 50Ω, as shown in FIG. 26. When Δf is increased, as described above, Δf enters the high Δf zone ZH shown in FIG. 23. Thus, displacement of the oscillator 30 is hardly obtained. Thus, it is considered that the B value is reduced.

Meanwhile, in FIG. 25, regardless of the load capacitance $C_L$, change of the B value with respect to the resistance value of the limit resistor Rd has a maximum value. Therefore, based on the relationship between the resistance value of the limit resistor Rd and the B value, which is shown in FIG. 25, the resistance value of the limit resistor Rd is preferably from 30Ω to 200Ω, more preferably from 40Ω to 120Ω. With this, the B value that is great can be obtained in an efficient and stable manner.

Note that, when the load capacitance $C_L$ is 150 pF, the B value is still great. Yet, particularly when the resistance value of the limit resistor Rd is 100Ω or less, oscillation stability is degraded in some cases. Thus, as described above, the load capacitance $C_L$ is preferably from 50 pF to 150 pF, more preferably 50 pF or greater and less than 150 pF.

As described above, the oscillation circuit 54 is a circuit including the circuit element 45 being the inverter IC, the feedback resister Rf, the limit resistor Rd, and the first capacitor Cg and the second capacitor Cd. The load capacitance $C_L$ is obtained in Expression (a) given below, wherein a capacitance of the first capacitor Cg is $C_g$ and a capacitance of the second capacitor Cd is $C_d$.

[Mathematical Equation 22]

$$C_L = \frac{C_d C_g}{C_d + C_g} \tag{a}$$

In this case, the load capacitance $C_L$ [pF] is preferably from 50 pF to 150 pF, more preferably 50 pF or greater and less than 150 pF.

When the load capacitance $C_L$ falls within the above-mentioned range, the B value that is greater can be obtained. With this, regardless of the oscillation condition of the oscillator 30, the sample signal derived from the object 14 to be measured can be demodulated at higher accuracy.

3. Laser Interferometers in First Modification Example to Fourth Modification Example Next, laser interferometers in a first modification example to a fourth modification example are described.

Figure 27:
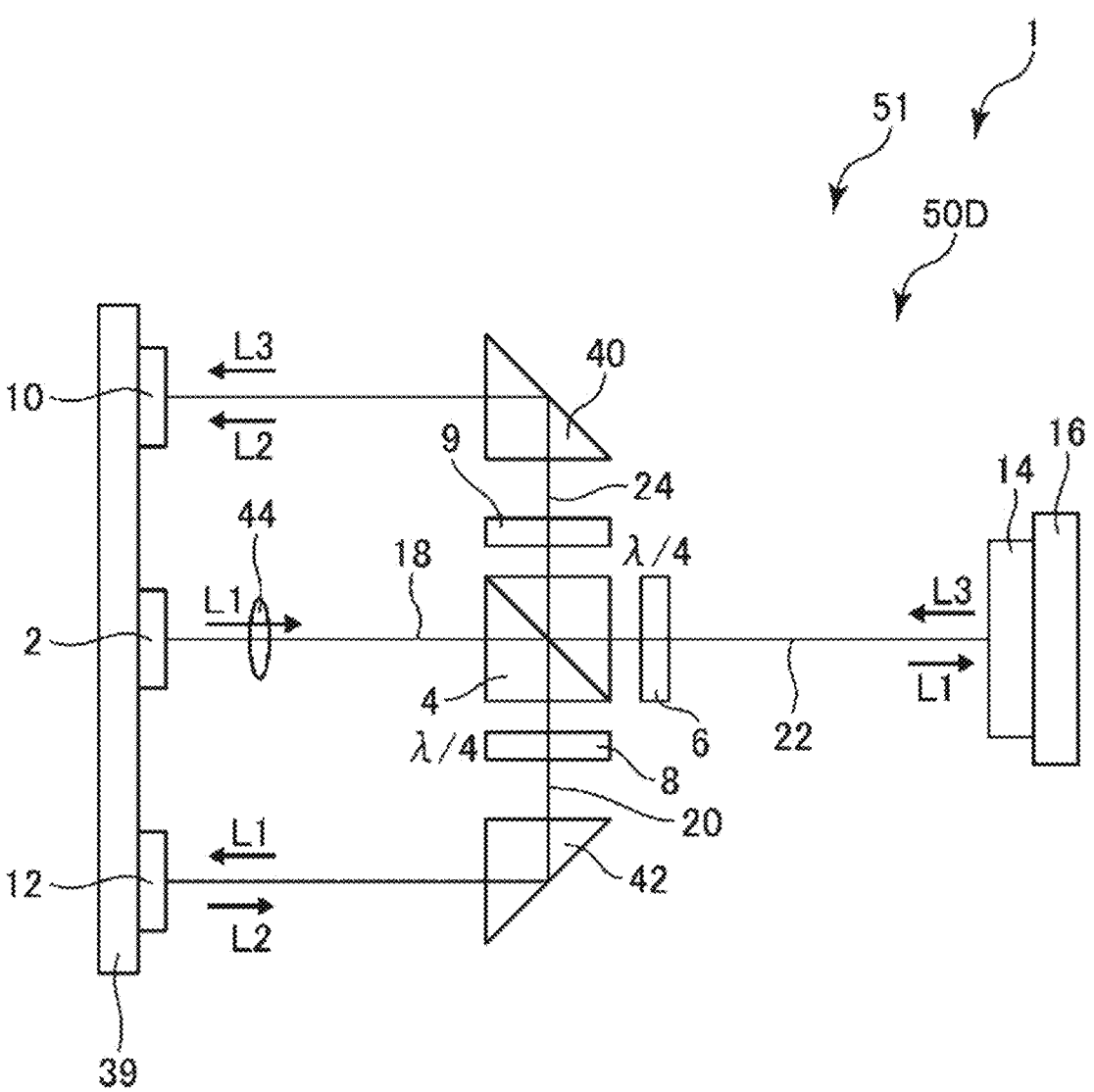
FIG. 27 is a schematic configuration view illustrating a mounting structure of an optical system included in a laser interferometer in a first modification example.
Figure 28:
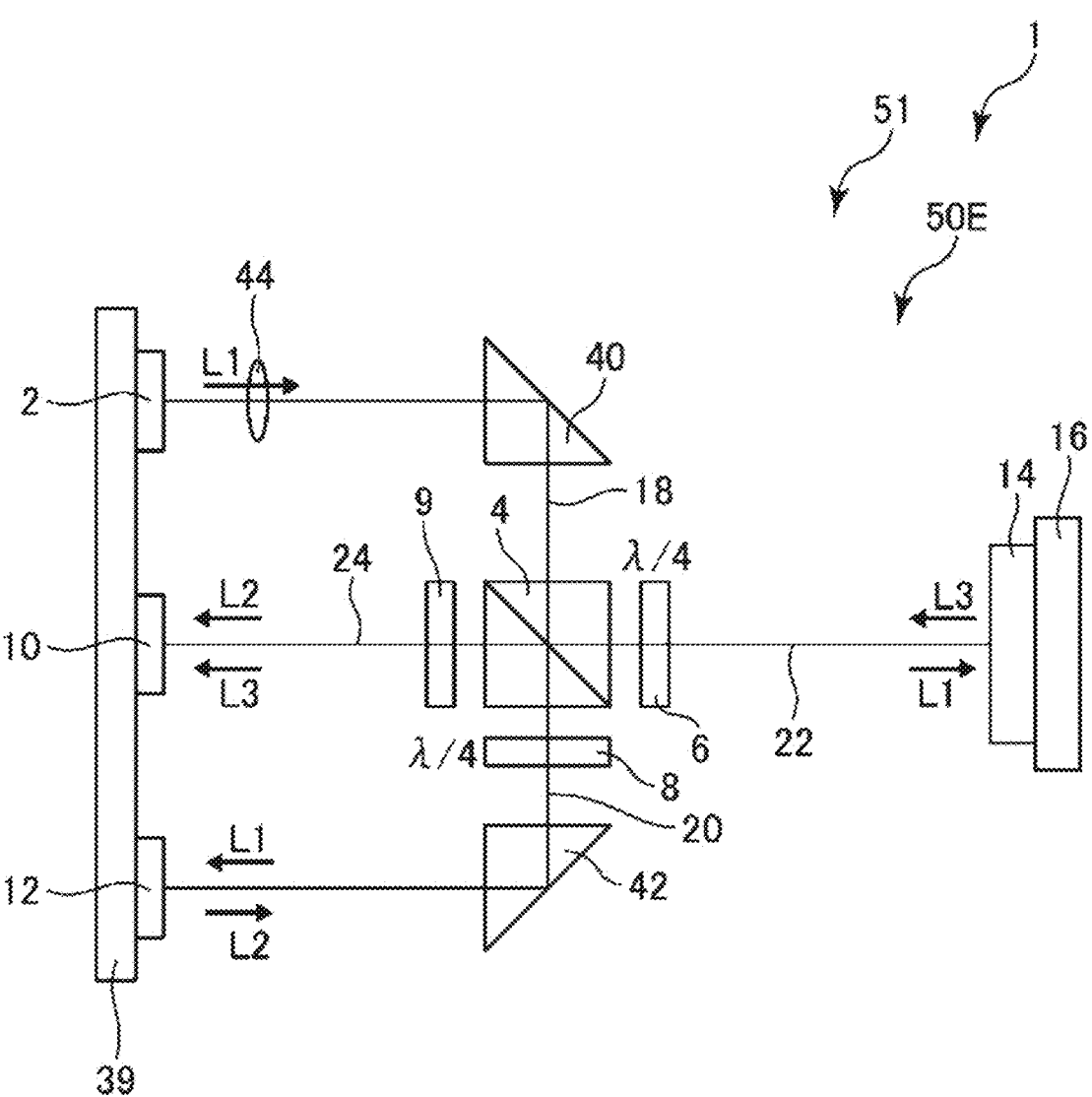
FIG. 28 is a schematic configuration view illustrating a mounting structure of an optical system included in a laser interferometer in a second modification example.
Figure 29:
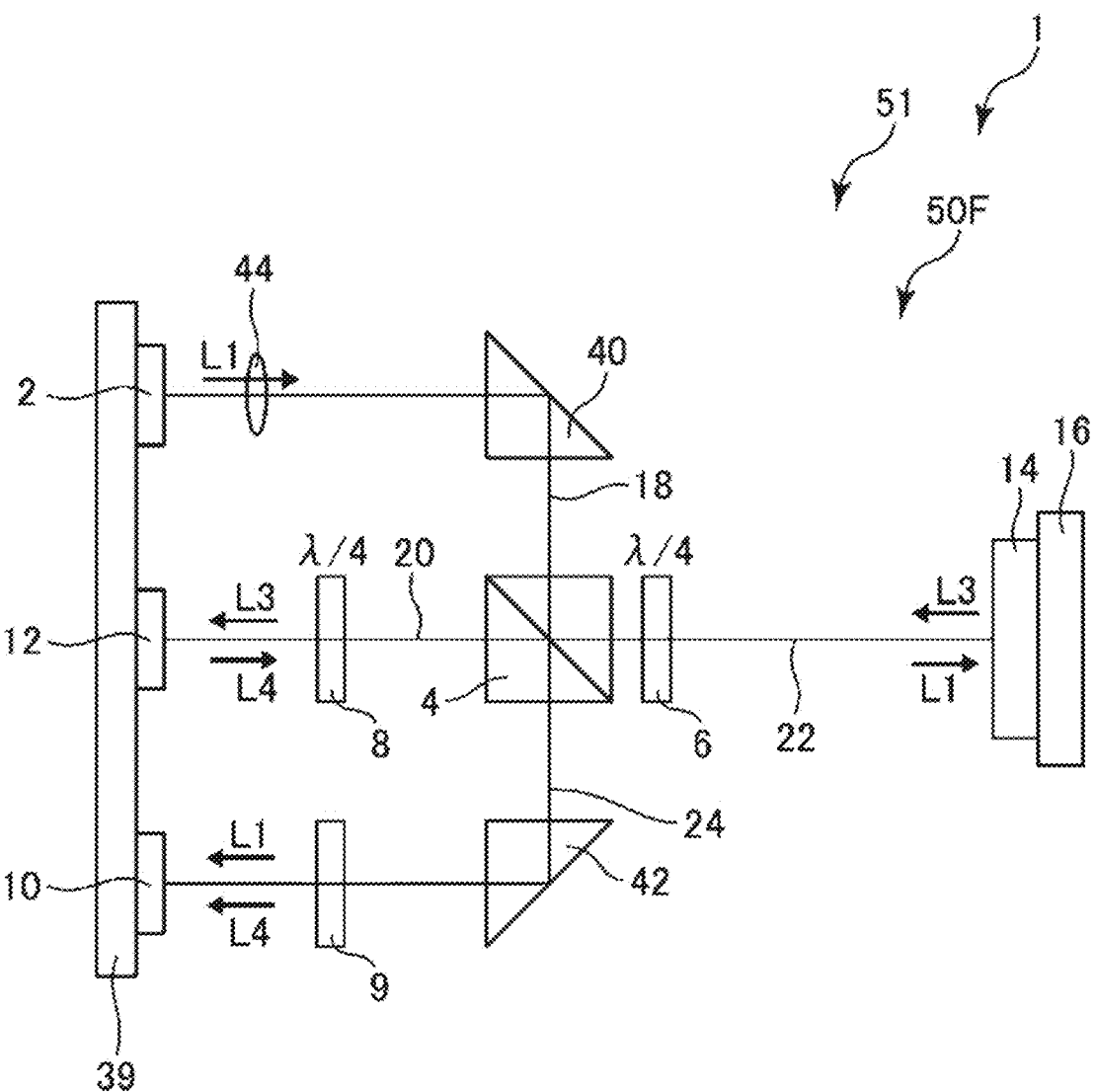
FIG. 29 is a schematic configuration view illustrating a mounting structure of an optical system included in a laser interferometer in a third modification example.
Figure 30:
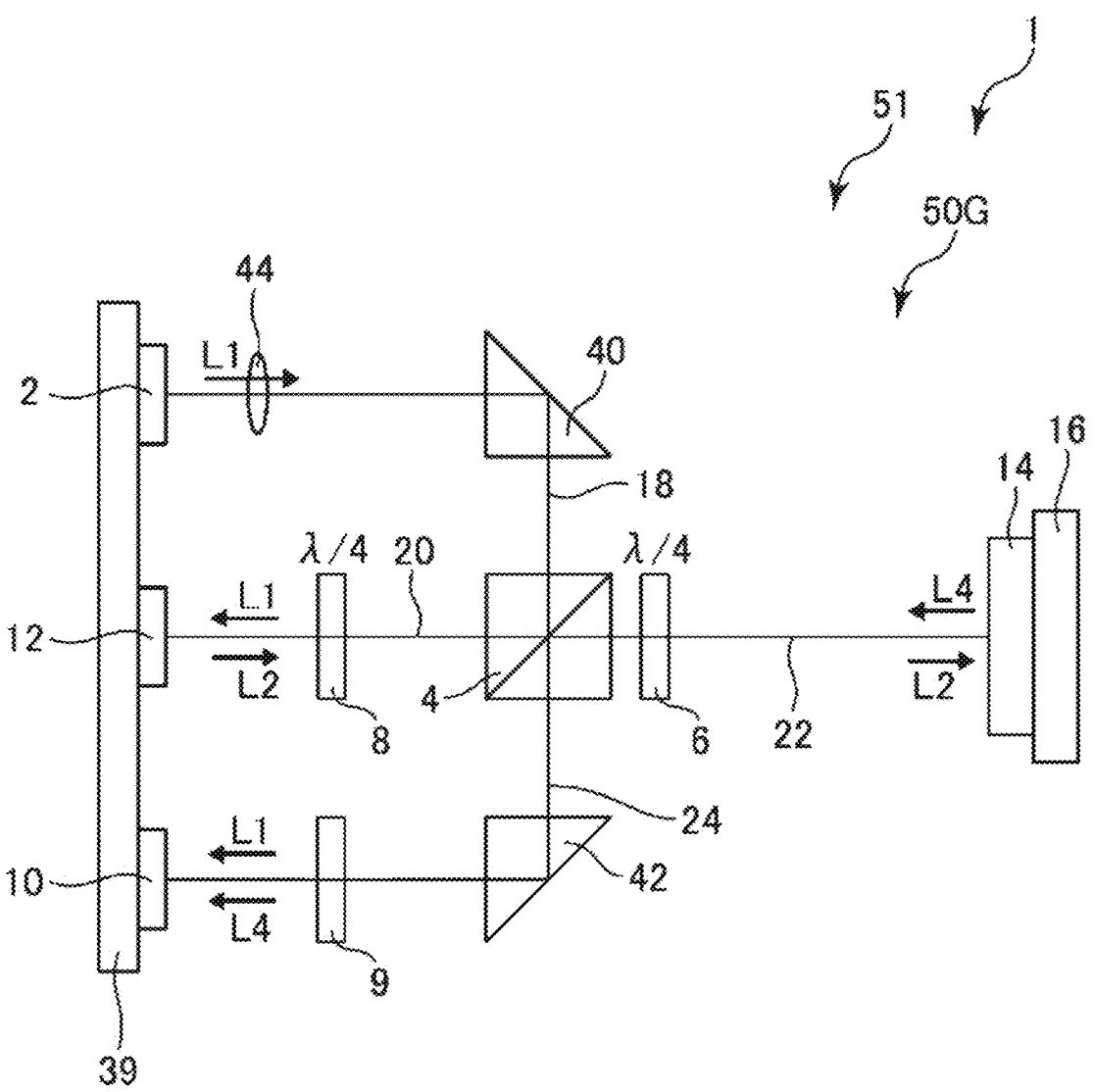
FIG. 30 is a schematic configuration view illustrating a mounting structure of an optical system included in a laser interferometer in a fourth modification example.

FIG. 27 is a schematic configuration view illustrating a mounting structure of an optical system included in the laser interferometer in the first modification example. FIG. 28 is a schematic configuration view illustrating a mounting structure of an optical system included in the laser interferometer in the second modification example. FIG. 29 is a schematic configuration view illustrating a mounting structure of an optical system included in the laser interferometer in the third modification example. FIG. 30 is a schematic configuration view illustrating a mounting structure of an optical system included in the laser interferometer in the fourth modification example.

The first to fourth modification examples are described below. In the description below, the differences from the exemplary embodiment described above is mainly described, and description for similar matters is omitted.

Note that, in FIG. 27 to FIG. 30, the same reference numbers are given to the same configurations as in the exemplary embodiment described above.

An optical system 50D of the laser interferometer 1 illustrated in FIG. 27 includes a base board 39. Each of the light source 2, the optical modulator 12, and the photoreceptor 10 is mounted on the base board 39. Further, on the base board 39 illustrated in FIG. 27, the photoreceptor 10, and the light source 2, and the optical modulator 12 are arranged and arrayed in the stated order along the direction orthogonal to the optical path 22.

Further, the optical system 50D illustrated in FIG. 27 includes prisms 40 and 42. The prism 40 is provided between the photoreceptor 10 and the optical analyzer 9 in the optical path 24. The prism 42 is provided between the optical modulator 12 and the ¼ wave plate 8 in the optical path 20.

Moreover, the optical system 50D illustrated in FIG. 27 includes a convex lens 44. The convex lens 44 is provided between the light source 2 and the polarized beam splitter 4 in the optical path 18. When the convex lens 44 is provided, the emitted light L1 emitted from the light source 2 can be converged and utilized effectively.

Similarly to the exemplary embodiment described above, the optical modulator 12 is also provided in the optical path 20 (first optical path), and the object 14 to be measured is also provided in the optical path 22 (second optical path) in the first modification example described above.

An optical system 50E of the laser interferometer 1 illustrated in FIG. 28 is similar to the optical system 50D illustrated in FIG. 27, except for the arrangement of the element and the like.

On the base board 39 illustrated in FIG. 28, the light source 2, the photoreceptor 10, and the optical modulator 12 are arranged and arrayed in the stated order along the direction orthogonal to the optical path 22. The prism 40 is provided in the optical path 18, and the prism 42 is provided in the optical path 20.

Similarly to the exemplary embodiment described above, the optical modulator 12 is also provided in the optical path 20 (first optical path), and the object 14 to be measured is also provided in the optical path 22 (second optical path) in the second modification example described above.

An optical system 50F of the laser interferometer 1 illustrated in FIG. 29 is similar to the optical system 50E illustrated in FIG. 28, except for the arrangement of the element and the like and the laser light received by the photoreceptor 10.

On the base board 39 illustrated in FIG. 29, the light source 2, the optical modulator 12, and the photoreceptor 10 are arranged and arrayed in the stated order along the direction orthogonal to the optical path 22. The prism 42 is provided in the optical path 24.

The emitted light L1 emitted from the light source 2 passes through the prism 40, and is divided by the polarized beam splitter 4 into the first optical path and the second optical path. In the third modification example illustrated in FIG. 29, the optical path obtained by combining the optical path 22 and the optical path 20 with each other corresponds to the first optical path, and the optical path 24 corresponds to the second optical path.

The emitted light L1 reflected by the polarized beam splitter 4 passes through the ¼ wave plate 6, and enters the object 14 to be measured, which is in a moving state. The emitted light L1 is subjected to Doppler shifting by the object 14 to be measured, and is reflected as the object light L3. The object light L3 passes through the ¼ wave plate 6, the polarized beam splitter 4, and the ¼ wave plate 8, and enters the optical modulator 12. The object light L3 is subjected to frequency shifting by the optical modulator 12, and is reflected as object reference light L4. The object reference light L4 passes through the ¼ wave plate 8, the polarized beam splitter 4, the prism 42 and the optical analyzer 9, and enters the photoreceptor 10.

Meanwhile, the emitted light L1 after passing through the polarized beam splitter 4 passes through the prism 42 and the optical analyzer 9, and enters the photoreceptor 10.

Further, the object reference light L4 and the emitted light L1 enters the photoreceptor 10 as interference light. The object reference light L4 is laser light containing the modulation signal and the sample signal.

In the third modification example as described above, both the object 14 to be measured and the optical modulator 12 are provided in the first optical path.

Further, in the present modification example, the photoreceptor 10 receives the interference light of the object reference light L4 and the emitted light L1, and the demodulation circuit 52 demodulates the sample signal contained in the object reference light L4, based on the reference signal Ss and the modulation signal contained in the object reference light L4.

An optical system 50G of the laser interferometer 1 illustrated in FIG. 30 is similar to the optical system 50F illustrated in FIG. 29, except for orientation of the light reflection surface of the polarized beam splitter 4.

The emitted light L1 emitted from the light source 2 passes through the prism 40, and is divided by the polarized beam splitter 4 into the first optical path and the second optical path. In the fourth modification example illustrated in FIG. 30, the optical path obtained by combining the optical path 20 and the optical path 22 with each other corresponds to the first optical path, and the optical path 24 corresponds to the second optical path.

The emitted light L1 reflected by the polarized beam splitter 4 passes through the ¼ wave plate 8, and enters the optical modulator 12. The emitted light L1 is subjected to frequency shifting by the optical modulator 12, and is reflected as the reference light L2. The reference light L2 passes through the ¼ wave plate 8, the polarized beam splitter 4, and the ¼ wave plate 6, and enters the object 14 to be measured, which is in a moving state. The reference light L2 is subjected to Doppler shifting by the object 14 to be measured, and is reflected as the object reference light L4. The object reference light L4 passes through the ¼ wave plate 6, the polarized beam splitter 4, the prism 42, and the optical analyzer 9, and enters the photoreceptor 10.

Meanwhile, the emitted light L1 after passing through the polarized beam splitter 4 passes through the prism 42 and the optical analyzer 9, and enters the photoreceptor 10.

Further, the object reference light L4 and the emitted light L1 enters the photoreceptor 10 as interference light. The object reference light L4 is laser light containing the modulation signal and the sample signal.

In the fourth modification example as described above, both the object 14 to be measured and the optical modulator 12 are provided in the first optical path.

Further, in the present modification example, the photoreceptor 10 receives the interference light of the object reference light L4 and the emitted light L1, and the demodulation circuit 52 demodulates the sample signal contained in the object reference light L4, based on the reference signal Ss and the modulation signal contained in the object reference light L4.

According to the mounting structures illustrated in FIG. 27 to FIG. 30, the laser interferometer 1 can be easily reduced in size. Note that the arrangement of the element is not limited to the illustrated arrangement. Note that the "first optical path" and the "second optical path" described above may be replaced with each other. For example, in a case of the fourth modification example, the optical path obtained by combining the optical path 20 and the optical path 22 with each other may correspond to the second optical path, and the optical path 24 may correspond to the first optical path. The same holds true in the exemplary embodiment and the other modification examples.

Further, in the mounting structures illustrated in FIG. 27 and FIG. 30, the photoreceptor 10 has a size of, for example, a 0.1-millimeter square, the light source 2 has a size of, for example, a 0.1-millimeter square, and the optical modulator 12 has a size of, for example, 0.5 to 10-millimeter square. Further, the base board 39 on which those constituent elements are mounted has a size of, for example, 1 to 10-millimeter square. With this, the size of the optical system can be reduced to an extent of the size of the base board 39.

According to the first to fourth modification examples described above, the same effects as those of the exemplary embodiment can be exerted.

The laser interferometer according to the present disclosure is described with reference to the illustrated exemplary embodiment. However, the laser interferometer according to the present disclosure is not limited to the exemplary embodiment, and the configuration of each of the units may be changed to a unit having any configuration capable of exhibiting the same function. Further, any other components may be added to the laser interferometer according to the exemplary embodiment. Further, the exemplary embodiment of the present disclosure may be a combination of any two or more of the exemplary embodiment and the modification examples.

What is claimed is:

1. A laser interferometer, comprising:
a light source configured to emit laser light;
an optical divider configured to divide the laser light into a first optical path and a second optical path;
an optical modulator on the first optical path;
an oscillation circuit configured to output a reference signal and a drive signal wherein
the optical modulator includes an oscillator that oscillates in a case where the drive signal is supplied to the oscillator,
the optical modulator includes a container that accommodates the oscillator and the oscillation circuit,
the optical modulator is configured to modulate the laser light by making the laser light enter the oscillator, and
the oscillator is a signal source of the oscillation circuit;
a photoreceptor configured to receive the laser light and output a photoreception signal, wherein the laser light is reflected by an object to be measured that is provided on the second optical path; and
a demodulation circuit configured to demodulate, from the photoreception signal, a Doppler signal derived from the object to be measured, wherein
the demodulation is based on the reference signal output from the oscillator and a modulation signal derived from the optical modulator,
the reference signal is changed according to an angular frequency of the modulation signal, the modulation signal is different from the Doppler signal, and $Iq/f \leq 1 \times 10^{-7}$ is satisfied, where an amplitude value of the current applied to the oscillator that is oscillating is Iq and an oscillation frequency of the oscillator is f.

2. The laser interferometer according to claim 1, wherein the oscillator is a crystal oscillator, and $2 \times 10^{-10} \leq Iq/f \leq 1 \times 10^{-7}$ is satisfied, where the amplitude value of the current applied to the crystal oscillator is Iq and the oscillation frequency of the crystal oscillator is f.

3. The laser interferometer according to claim 2, wherein the oscillation circuit is a circuit including an inverter, a feedback resistor, a limit resistor, a first capacitor, and a second capacitor, a load capacitance Ct of the oscillation circuit is indicated in Expression (a)

[Mathematical Equation 1]

$$C_L = \frac{C_d C_g}{C_d + C_g} \tag{a}$$

a capacitance of the first capacitor is $C_g$, a capacitance of the second capacitor is $C_d$, and the load capacitance $C_L$ is from 50 pF to 150 pF.

4. The laser interferometer according to claim 3, wherein a resistance value of the limit resistor is from 30Ω to 200Ω.

5. The laser interferometer according to claim 1, wherein the oscillator is a Si oscillator, and $4 \times 10^{-10} \leq Iq/f \leq 5 \times 10^{-8}$ is satisfied, where the amplitude value of the current applied to the Si oscillator is Iq and the oscillation frequency of the Si oscillator is f.

6. The laser interferometer according to claim 5, wherein the oscillation circuit is a circuit including an inverter, a feedback resistor, a limit resistor, a first capacitor, and a second capacitor, a load capacitance $C_L$ of the oscillation circuit is indicated in Expression (a)

[Mathematical Equation 1]

$$C_L = \frac{C_d C_g}{C_d + C_g} \tag{a}$$

a capacitance of the first capacitor is $C_g$, a capacitance of the second capacitor is $C_d$, and the load capacitance $C_L$ is from 50 pF to 150 pF.

7. The laser interferometer according to claim 6, wherein a resistance value of the limit resistor is from 30Ω to 200Ω.

8. The laser interferometer according to claim 1, wherein the container includes:

a container main body having an opening; and a lid that closes the opening, and the oscillator and the oscillation circuit are arranged inside the container main body.

9. The laser interferometer according to claim 8, wherein the container main body includes a first recess that is inside the opening of the container main body, and the oscillator is arranged on a bottom surface of the first recess.

10. The laser interferometer according to claim 9, wherein the container main body includes a second recess that is on an inner side of the first recess and is deeper than the first recess, and the oscillation circuit is arranged on a bottom surface of the second recess.

11. The laser interferometer according to claim 10, wherein the oscillator and the oscillation circuit are arranged such that the oscillator overlaps the oscillation circuit.

* * * * *